(12) United States Patent
Garofolo et al.

(10) Patent No.: US 11,902,646 B2
(45) Date of Patent: Feb. 13, 2024

(54) WEARABLE SYSTEMS HAVING REMOTELY POSITIONED VISION REDIRECTION

(71) Applicant: Vertical Optics, Inc., Las Vegas, NV (US)

(72) Inventors: Timothy Richard Garofolo, San Diego, CA (US); David Lynn Devernoe, San Diego, CA (US)

(73) Assignee: Vertical Optics, Inc., Las Vegas, NV (US)

( * ) Notice: Subject to any disclaimer, the term of this patent is extended or adjusted under 35 U.S.C. 154(b) by 0 days.

(21) Appl. No.: 18/079,584

(22) Filed: Dec. 12, 2022

(65) Prior Publication Data

US 2023/0179849 A1     Jun. 8, 2023

Related U.S. Application Data

(63) Continuation of application No. 16/079,554, filed as application No. PCT/US2017/019028 on Feb. 23, 2017, now Pat. No. 11,528,393.

(30) Foreign Application Priority Data

Feb. 23, 2016   (IL) .......................................... 244255

(51) Int. Cl.
*G02C 9/00*     (2006.01)
*H04N 23/56*    (2023.01)
(Continued)

(52) U.S. Cl.
CPC ........... *H04N 23/54* (2023.01); *G02B 27/025* (2013.01); *G02B 27/028* (2013.01); *G02C 9/00* (2013.01);
(Continued)

(58) Field of Classification Search
CPC ........ H04N 23/54; H04N 23/55; H04N 23/57; H04N 13/344; G02C 11/10; G02C 7/088;
(Continued)

(56) References Cited

U.S. PATENT DOCUMENTS

| | | | |
|---|---|---|---|
| 2,472,600 A | 6/1949 | Luboshez | |
| 2,862,418 A | 12/1958 | Lowenthal | |

(Continued)

FOREIGN PATENT DOCUMENTS

| | | |
|---|---|---|
| CA | 2568900 | 4/2011 |
| CN | 103748598 | 4/2014 |

(Continued)

OTHER PUBLICATIONS

USPTO; U.S. Appl. No. 15/058,152; Notice of Allowance dated Apr. 14, 2017.
(Continued)

*Primary Examiner* — Paul M Berardesca
(74) *Attorney, Agent, or Firm* — Fitch, Even, Tabin & Flannery LLP

(57) ABSTRACT

The present disclosure relates to cantilevered imaging modality wearable optical systems that provide for optimal ergonomics coupled with vision enhancement and vision magnification. Methods of use, devices, and kits are also contemplated.

14 Claims, 9 Drawing Sheets

(51) Int. Cl.
*H04N 23/695* (2023.01)
*H04N 23/53* (2023.01)
*G06F 1/16* (2006.01)
*G02C 9/02* (2006.01)
*G02B 27/02* (2006.01)
*H04N 23/54* (2023.01)
*G06F 3/01* (2006.01)
*G06F 3/16* (2006.01)
*H04N 5/262* (2006.01)
*H04N 23/68* (2023.01)

(52) U.S. Cl.
CPC ............... *G02C 9/02* (2013.01); *G06F 1/163* (2013.01); *G06F 3/013* (2013.01); *G06F 3/165* (2013.01); *H04N 5/2628* (2013.01); *H04N 23/531* (2023.01); *H04N 23/56* (2023.01); *H04N 23/682* (2023.01); *H04N 23/695* (2023.01)

(58) Field of Classification Search
CPC .......... G02B 27/027; G02B 2027/0138; G02B 2027/0178
See application file for complete search history.

(56) References Cited

U.S. PATENT DOCUMENTS

| | | | | |
|---|---|---|---|---|
| 3,019,689 | A | 2/1962 | Paulsrud | |
| 3,029,696 | A | 4/1962 | Schmidt | |
| 3,522,983 | A | 8/1970 | Daniels | |
| 3,745,993 | A | 7/1973 | Feinbloom | |
| 4,077,703 | A | 3/1978 | Pablo | |
| 4,143,938 | A | 3/1979 | Feinbloom | |
| 4,232,943 | A | 11/1980 | Rogers | |
| 4,498,743 | A | 2/1985 | Feinbloom | |
| 4,621,283 | A | 11/1986 | Feinbloom | |
| 4,792,223 | A | 12/1988 | Axelbaum | |
| 4,797,736 | A | 1/1989 | Kloots | |
| 4,799,793 | A | 1/1989 | Feinbloom | |
| 4,902,116 | A | 2/1990 | Ellis | |
| 4,946,257 | A | 8/1990 | Feinbloom | |
| 4,988,185 | A | 1/1991 | Feinbloom | |
| 5,090,796 | A | 2/1992 | Feinbloom | |
| 5,166,823 | A | 11/1992 | Feinbloom | |
| 5,173,720 | A | 12/1992 | Lee | |
| 5,291,229 | A | 3/1994 | Feinbloom | |
| 5,422,759 | A | 6/1995 | Lee | |
| 5,652,636 | A | 7/1997 | Feinbloom | |
| 5,667,291 | A | 9/1997 | Caplan | |
| 5,769,523 | A | 6/1998 | Feinbloom | |
| 5,822,048 | A | 10/1998 | Feinbloom | |
| 5,838,504 | A | 11/1998 | Ichikawa | |
| 5,870,166 | A | 2/1999 | Chang | |
| 5,923,467 | A | 7/1999 | Pericic | |
| 6,007,035 | A | 12/1999 | Feinbloom | |
| 6,023,372 | A | 2/2000 | Spitzer | |
| 6,064,520 | A | 5/2000 | Nowak | |
| 6,120,145 | A | 9/2000 | Lyst, Jr. | |
| 6,120,161 | A | 9/2000 | Van Der Bel | |
| 6,198,581 | B1 | 3/2001 | Shoji | |
| 6,280,031 | B1 | 8/2001 | Zerkle | |
| 6,333,814 | B1 | 12/2001 | Chang | |
| 6,366,411 | B1 | 4/2002 | Kimura | |
| 6,493,136 | B2 | 12/2002 | Chang | |
| 6,549,337 | B2 | 4/2003 | Iizuka | |
| 6,667,833 | B1 | 12/2003 | Fay | |
| 6,704,141 | B1 * | 3/2004 | Nowak | G02B 23/18 359/411 |
| 6,830,331 | B2 * | 12/2004 | Jojiki | G02C 7/14 351/158 |
| 7,006,861 | B2 | 2/2006 | Flock | |
| 7,072,124 | B2 | 7/2006 | Wilt | |
| 7,184,208 | B2 | 2/2007 | Tamura | |
| 7,212,353 | B2 | 5/2007 | Sunaga | |
| 7,484,847 | B2 | 2/2009 | Fuziak, Jr. | |
| 7,494,219 | B2 | 2/2009 | Shahkarami | |
| D592,693 | S | 5/2009 | Chang | |
| D602,185 | S | 10/2009 | Chang | |
| 7,641,335 | B2 | 1/2010 | Chang | |
| 7,645,050 | B2 | 1/2010 | Wilt | |
| 7,673,989 | B2 | 3/2010 | Chang | |
| 7,675,678 | B2 | 3/2010 | Woker | |
| D617,825 | S | 6/2010 | Chang | |
| 7,798,638 | B2 | 9/2010 | Fuziak, Jr. | |
| 7,889,429 | B2 | 2/2011 | Achtner | |
| D636,011 | S | 4/2011 | Chang | |
| 7,980,729 | B2 | 7/2011 | Feinbloom | |
| 8,068,169 | B2 * | 11/2011 | Chang | A61B 90/35 396/428 |
| 8,120,847 | B2 | 2/2012 | Chang | |
| 8,215,791 | B2 | 7/2012 | Feinbloom | |
| D682,450 | S | 5/2013 | Chang | |
| 8,446,670 | B2 | 5/2013 | Woker | |
| 8,573,866 | B2 | 11/2013 | Bond | |
| 8,662,709 | B2 | 3/2014 | Chang | |
| 8,693,732 | B2 | 4/2014 | Eilat | |
| 8,744,113 | B1 | 6/2014 | Rickards | |
| 8,749,890 | B1 | 6/2014 | Wood | |
| 8,814,691 | B2 | 8/2014 | Haddick | |
| 8,830,588 | B1 | 9/2014 | Brown | |
| 8,851,709 | B2 | 10/2014 | Feinbloom | |
| 8,964,291 | B2 | 2/2015 | Chang | |
| 8,976,086 | B2 | 3/2015 | Hilkes | |
| 9,052,455 | B2 | 6/2015 | Chang | |
| 9,053,483 | B2 | 6/2015 | Geisner | |
| 9,122,916 | B2 | 9/2015 | Fujimura | |
| 9,132,346 | B2 | 9/2015 | Huebner | |
| 9,142,062 | B2 | 9/2015 | Maciocci | |
| 9,160,906 | B2 | 10/2015 | Bond | |
| 9,189,021 | B2 | 11/2015 | Jerauld | |
| D746,354 | S | 12/2015 | Chang | |
| 9,202,443 | B2 | 12/2015 | Perez | |
| 9,208,615 | B2 | 12/2015 | Kashitani | |
| 9,219,849 | B2 | 12/2015 | Feinbloom | |
| 9,250,746 | B2 | 2/2016 | Wala | |
| 9,305,365 | B2 | 4/2016 | Lovberg | |
| 9,372,348 | B2 | 6/2016 | Hilkes | |
| 9,384,594 | B2 | 7/2016 | Maciocci | |
| 9,516,283 | B2 | 12/2016 | Hilkes | |
| 9,690,119 | B2 | 6/2017 | Garofolo | |
| 9,729,831 | B2 | 8/2017 | Birnkrant | |
| 9,772,495 | B2 | 9/2017 | Tam | |
| 9,864,214 | B2 * | 1/2018 | Fass | G02B 25/004 |
| 9,888,183 | B2 | 2/2018 | Rousseau | |
| 10,013,808 | B2 | 7/2018 | Jones | |
| 10,222,619 | B2 | 3/2019 | Yu | |
| 10,225,526 | B2 | 3/2019 | Hilkes | |
| 10,286,248 | B2 | 5/2019 | McQueen | |
| 10,423,012 | B2 | 9/2019 | Garofolo | |
| 10,448,004 | B1 | 10/2019 | Shau | |
| 10,459,254 | B2 | 10/2019 | Antaki | |
| 10,462,428 | B1 | 10/2019 | Grabow | |
| 10,495,885 | B2 | 12/2019 | Hilkes | |
| 10,546,423 | B2 | 1/2020 | Jones | |
| 10,580,217 | B2 | 3/2020 | Jones | |
| 10,650,594 | B2 | 5/2020 | Jones | |
| 10,667,981 | B2 | 6/2020 | Osterhout | |
| 10,778,944 | B2 | 9/2020 | Hilkes | |
| 10,877,262 | B1 | 12/2020 | Luxembourg | |
| 10,895,742 | B2 | 1/2021 | Schneider | |
| 2006/0245052 | A1 | 11/2006 | Wilt | |
| 2007/0171520 | A1 | 7/2007 | Fante | |
| 2007/0273983 | A1 | 11/2007 | Hebert | |
| 2008/0169998 | A1 | 7/2008 | Jacobsen | |
| 2008/0259272 | A1 | 10/2008 | Shahrarami | |
| 2009/0116225 | A1 | 5/2009 | Feinbloom | |
| 2010/0079356 | A1 | 4/2010 | Hoellwarth | |
| 2010/0110368 | A1 | 5/2010 | Chaum | |
| 2010/0123776 | A1 | 5/2010 | Wydeven | |
| 2010/0149323 | A1 | 6/2010 | Yoo | |
| 2010/0165605 | A1 | 7/2010 | Feinbloom | |
| 2010/0165617 | A1 | 7/2010 | Feinbloom | |
| 2010/0199232 | A1 | 8/2010 | Mistry | |

(56) References Cited

U.S. PATENT DOCUMENTS

| | | |
|---|---|---|
| 2010/0290115 A1 | 11/2010 | Chang |
| 2010/0315587 A1* | 12/2010 | Leeper ............ G02C 7/14 351/116 |
| 2011/0227813 A1 | 9/2011 | Haddick |
| 2012/0068913 A1 | 3/2012 | Bar-Zeev |
| 2012/0113209 A1 | 5/2012 | Ritchey |
| 2012/0119978 A1 | 5/2012 | Border |
| 2012/0120636 A1 | 5/2012 | Wilt |
| 2012/0194550 A1 | 8/2012 | Osterhout |
| 2012/0229367 A1 | 9/2012 | Magyari |
| 2012/0235887 A1 | 9/2012 | Border |
| 2012/0249591 A1 | 10/2012 | Maciocci |
| 2012/0263449 A1 | 10/2012 | Bond |
| 2012/0275140 A1 | 11/2012 | Feinbloom |
| 2012/0306725 A1 | 12/2012 | Hilkes |
| 2013/0010068 A1 | 1/2013 | Tiernan |
| 2013/0044042 A1 | 2/2013 | Olsson |
| 2013/0088582 A1 | 4/2013 | Moinzadeh |
| 2013/0094081 A1 | 4/2013 | Chang |
| 2013/0147859 A1 | 6/2013 | Kobayashi |
| 2013/0169683 A1 | 7/2013 | Perez |
| 2013/0222757 A1 | 8/2013 | Klein |
| 2013/0235331 A1 | 9/2013 | Heinrich |
| 2013/0249787 A1 | 9/2013 | Morimoto |
| 2013/0293583 A1 | 11/2013 | Kashitani |
| 2013/0328770 A1 | 12/2013 | Parham |
| 2013/0335543 A1 | 12/2013 | Hilkes |
| 2014/0028968 A1 | 1/2014 | Olsson |
| 2014/0036356 A1 | 2/2014 | Feinbloom |
| 2014/0125789 A1 | 5/2014 | Bond |
| 2014/0132484 A1 | 5/2014 | Pandey |
| 2014/0139420 A1 | 5/2014 | Wu |
| 2014/0146153 A1 | 5/2014 | Birnkrant |
| 2014/0184881 A1 | 7/2014 | McKinley |
| 2014/0184890 A1 | 7/2014 | McKinley |
| 2014/0184899 A1 | 7/2014 | McKinley |
| 2014/0198190 A1 | 7/2014 | Okumu |
| 2014/0270685 A1 | 9/2014 | Letke |
| 2014/0293588 A1 | 10/2014 | Chang |
| 2015/0002676 A1 | 1/2015 | Yoo |
| 2015/0002768 A1 | 1/2015 | Wu |
| 2015/0003049 A1 | 1/2015 | Chang |
| 2015/0018622 A1* | 1/2015 | Tesar ............ A61B 90/20 600/202 |
| 2015/0022542 A1 | 1/2015 | Baba |
| 2015/0048911 A1 | 2/2015 | Dauer |
| 2015/0077416 A1 | 3/2015 | Villmer |
| 2015/0084841 A1 | 3/2015 | Hilkes |
| 2015/0123880 A1 | 5/2015 | Tam |
| 2015/0146090 A1 | 5/2015 | Feinbloom |
| 2015/0146091 A1 | 5/2015 | Feinbloom |
| 2015/0146290 A1 | 5/2015 | Chang |
| 2015/0169050 A1 | 6/2015 | Publicover |
| 2015/0244910 A1 | 8/2015 | Marston |
| 2015/0309316 A1 | 10/2015 | Osterhout |
| 2015/0310668 A1 | 10/2015 | Ellerbrock |
| 2015/0331230 A1 | 11/2015 | Wilt |
| 2015/0355481 A1 | 12/2015 | Hilkes |
| 2015/0377462 A1 | 12/2015 | Wilt |
| 2016/0026067 A1 | 1/2016 | Feinbloom |
| 2016/0212350 A1 | 7/2016 | Rousseau |
| 2016/0225192 A1 | 8/2016 | Jones |
| 2016/0282628 A1 | 9/2016 | Hilkes |
| 2016/0334644 A1* | 11/2016 | Garofolo ............ H04N 7/183 |
| 2017/0078623 A1 | 3/2017 | Hilkes |
| 2017/0199387 A1 | 7/2017 | Koch, III |
| 2017/0235161 A1 | 8/2017 | Hilkes |
| 2017/0248788 A1 | 8/2017 | Osterhout |
| 2017/0293162 A1 | 10/2017 | Garofolo |
| 2018/0136489 A1 | 5/2018 | Hellström |
| 2018/0143434 A1 | 5/2018 | Hamra |
| 2018/0316834 A1 | 11/2018 | Grabow |
| 2019/0070064 A1 | 3/2019 | Hogle |
| 2019/0179409 A1 | 6/2019 | Jones |
| 2019/0199974 A1 | 6/2019 | Hilkes |
| 2019/0384065 A1 | 12/2019 | Shau |
| 2020/0160578 A1 | 5/2020 | Jones |
| 2020/0218069 A1 | 7/2020 | Koike |
| 2020/0218096 A1 | 7/2020 | Hilkes |
| 2021/0003868 A1 | 1/2021 | Garofolo |
| 2021/0022599 A1 | 1/2021 | Freeman |
| 2021/0067764 A1 | 3/2021 | Shau |
| 2021/0185193 A1 | 6/2021 | Garofolo |
| 2021/0257084 A1* | 8/2021 | Freeman ............ A42B 3/228 |

FOREIGN PATENT DOCUMENTS

| | | |
|---|---|---|
| DE | 2525765 | 12/1976 |
| DE | 202011005311 | 11/2011 |
| EP | 1491938 | 1/2010 |
| EP | 2702886 | 3/2014 |
| EP | 2440845 | 1/2021 |
| FR | 3032282 | 8/2016 |
| GB | 2332062 | 6/1999 |
| GB | 2551841 | 1/2018 |
| JP | 4741813 | 8/2011 |
| WO | 199637730 | 11/1996 |
| WO | 199954773 | 10/1999 |
| WO | 2003007048 | 1/2003 |
| WO | 2010115082 | 10/2010 |
| WO | 2010144426 | 12/2010 |
| WO | 2012018784 | 2/2012 |
| WO | 2012038582 | 3/2012 |
| WO | 2013049248 | 4/2013 |
| WO | 2013177654 | 12/2013 |
| WO | 2014053841 | 4/2014 |
| WO | 2014210091 | 12/2014 |
| WO | 2015048911 | 4/2015 |
| WO | 2015095737 | 6/2015 |
| WO | WO-2016187064 A1 * | 11/2016 ......... A61B 1/00096 |
| WO | 2016195972 | 12/2016 |
| WO | 2017147235 | 8/2017 |
| WO | 2018002674 | 1/2018 |

OTHER PUBLICATIONS

PCT; App. No. PCT/US2016/032535; International Preliminary Report on Patentability dated May 5, 2017.

PCT; App. No. PCT/US2016/032535; International Search Report and Written Opinion dated Sep. 8, 2016.

USPTO; U.S. Appl. No. 15/632,346; Office Action dated Nov. 20, 2018.

USPTO; U.S. Appl. No. 15/632,346; Office Action dated May 7, 2019.

USPTO; U.S. Appl. No. 15/632,346; Notice of Allowance dated Sep. 3, 2019.

USPTO; U.S. Appl. No. 16/578,381; Notice of Allowance dated Jul. 21, 2021.

PCT; App. No. PCT/US2017/019028; International Search Report and Written Opinion dated Aug. 31, 2017.

PCT; App. No. PCT/US2017/019028; International Preliminary Report on Patentability dated Aug. 28, 2018.

USPTO; U.S. Appl. No. 16/079,554; Office Action dated Jul. 12, 2021.

USPTO; U.S. Appl. No. 16/578,381; Office Action dated Feb. 16, 2022.

USPTO; U.S. Appl. No. 16/079,554; Notice of Allowance dated Dec. 3, 2021.

USPTO; U.S. Appl. No. 16/079,554; Notice of Allowance dated Aug. 11, 2022.

USPTO; U.S. Appl. No. 18/079,864; Office Action dated Mar. 22, 2023; Attorney Docket No. VERT2CON.

* cited by examiner

WEARABLE SYSTEMS HAVING REMOTELY POSITIONED VISION REDIRECTION

RELATED APPLICATIONS

This application is a continuation of U.S. application Ser. No. 16/079,554 filed Aug. 23, 2018, which is a United States national stage entry of an International Application serial no. PCT/US2017/019028 filed Feb. 23, 2017, which claims priority to Israel Patent Application No. 244255, filed Feb. 23, 2016, the contents of all of which are hereby incorporated by reference in their entirety.

TECHNICAL FIELD

The present disclosure relates to wearable optical devices that comprise an imaging modality that is remotely positioned from the eyes of a user that redirect and optionally magnify the vision of a user.

BACKGROUND

A loupe is a known magnification device that, unlike a conventional magnifying glass, is typically devoid of a handle and, therefore, requires the lens body to be supported or otherwise grasped by, for example, the user's hand. However, for professionals such as surgeons, dentists, veterinarians and jewelers, this can be problematic, since both hands are typically required when working.

Loupes are widely used for magnifying a work area during precision work such as surgery, dental work, electronics work, and assembly of miniature parts. Typically, a pair of loupes are provided that may be mounted to an eyeglass frame or headband. Loupes combine the long working distance of the telescope with the high quality magnification of a microscope. This type of optical instrument provides the user with a magnified field of view at a predetermined distance. The mounting assemblies used in typical loupes provide a variety of degrees of freedom for the user, for example, by way of adjusting interpupillary distance and arranging the eyeglass frame in a specific orientation on the user's head.

Although a wide range of adjustments increases flexibility, manipulation of the user's body outside of an optimal ergonomic orientation is generally required. For example, a user such as a dentist is required to bend at the lower and upper back, and neck, and prolonged eye tilting outside of the natural meridian coupled with intense focus to view the optics to provide an optimal viewing angle for a procedure. Even utilizing the latest in so-called "ergonomic" loupes, this bodily contortion and eye focus strain are required. In addition, other medical and industrial professionals, in addition to laymen performing recreational and/or routine tasks often have to assume a back or neck contorted posture to assume an optimal viewing angle of something or some task. Such postures cause strain in the head, neck, and other areas leading to accelerated fatigue and overuse injuries, especially if such a posture is required for prolonged periods of time. The magnitude of the ergonomic problem in the health care fields due to poor ergonomics is staggering. For instance, in the dental field alone, over 90% of dentists and dental hygienists experience some form of back, neck, and/or shoulder pain. The epidemic is estimated to cost Americans, as one example, of over $50 Billion per year.

As such, there exists a need to provide ergonomically-optimal high quality magnification for users performing precision work or other tasks. The present disclosure addresses these and other needs in the art.

SUMMARY

In frequent embodiments, a wearable optical system is provided comprising: a user wearable frame comprising a display that is viewable by a user via a horizontal optical path, wherein the user wearable frame is adapted to be worn on the head of a user; and a support attached to the user wearable frame, wherein the support comprises an imaging modality positioned on the support at a horizontal distance "D" from the front of the head of the user and directed in a work area optical path downward relative to the horizontal optical path, and wherein the imaging modality is in optical communication with the display, wherein the vision redirecting mechanism or the viewing portion magnifies an image passed through the work area optical path, and wherein the image is provided for viewing on the display and an image stabilization is provided for the imaging modality or the image.

In also often included embodiments, a wearable optical system is provided comprising: a user wearable frame comprising a display that is viewable by a user via a horizontal optical path, wherein the user wearable frame is adapted to be worn on the head of a user; and a support attached to the user wearable frame, wherein the support comprises an imaging modality positioned on the support at a horizontal distance of between about 4 inches to about 15 inches from the front of the head of the user and directed in a work area optical path downward relative to the horizontal optical path, and wherein the imaging modality is in optical communication with the display, wherein the vision redirecting mechanism or the viewing portion magnifies an image passed through the work area optical path, wherein the imaging modality is configured for manual or automated movement between one or more different positions on the support and/or the support is configured to be retractable relative to the user wearable frame, and wherein the image is provided for viewing on the display and an image stabilization is provided for the imaging modality or the image.

Often, D is between about 5 inches and 20 inches. Also often, D is at or about 2, 3, 4, 5, 6, 7, 8, 9, 10, 11, 12, 13, 14, 15, 16, 17, 18, 19, 20, 21, 22, 24, or 24 inches. Often, D is at or between about 4 inches and 15 inches. Also often, D is between at or about 4 inches and 9 inches. Also often, D is at or between about 5 inches and 10 inches. Frequently in the included embodiments, D is measured from the location of the display.

In often included embodiments the support is removably attached to the user wearable frame. Also often, the imaging modality is comprised in a cart movably positioned on the support. In frequent embodiments, the cart is configured for manual or automated movement between one or more different positions on the support. In certain often included embodiments, two or more supports are attached to the user wearable frame, wherein each of the two or more supports comprises an imaging modality. Often one or more of these supports is/are removable from the user wearable frame. Often, two or more supports are attached to the user wearable frame, wherein the imaging modality is attached between two or more of the supports, and wherein the attachment of the imaging modality between the two or more is a movable or fixed attachment. In frequent embodiments the user wearable frame and the support are comprised in a single unit. In often included embodiments, the support is retractable relative to the user wearable frame such that, when retracted, the distance D is decreased or eliminated. Also often, each of the two or more supports is retractable relative to the user wearable frame such that, when retracted, the distance D is decreased or eliminated. In frequent embodiments, the support or attachment thereof to the user wearable frame is configured for positional adjustment of the support between one or more different horizontally angled or vertically angled positions.

Frequently, the electronic image stabilization comprises optical or digital image stabilization. In the most frequent embodiments contemplated herein the image modality comprises a camera. Often, the camera is configured to rotate vertically within a plane below the horizontal optical path and/or is configured to rotate laterally relative to the plane. Also often, the configuration to rotate comprises automated rotation or manual rotation. In certain frequent embodiments, the imaging modality is weighted to orient the imaging modality in a predetermined vertical angle relative to the horizontal optical path. Frequently, this orientation is provided while the support or device moves such that minor movements of the user do not alter or negatively affect the positioning of the work are optical path. Often, the predetermined vertical angle is at or about 90°. Also often, the predetermined vertical angle is between at or about 75° and 110°. Often, the predetermined angle is between at or about 80° and 100°, or between at or about 85° to 95°. In certain embodiments, the imaging modality comprises one or more weighted rods. Also, in certain embodiments, a housing, lens, or lens cover of the imaging modality is weighted. Often, the system comprises a tracking algorithm to orient the work site optical path to a predetermined location. Also often, the system is configured to provide automated tracking and work site optical path centering or focus on a predetermined location.

In certain frequent embodiments, one or more functions of the system are controlled by the movement of an eye, an eyelid, or part of an eye of the subject wearing the device. Also in frequent embodiments, one or more functions of the system are controlled by voice command. In certain frequent embodiments, one or more functions of the system are controlled by voice command and/or controlled by the movement of an eye, an eyelid, or part of an eye of the subject wearing the device.

In often included embodiments, the one or more functions comprises altering an optical or a digital focus of the imaging modality or display, movement of a focus of the imaging modality or display, movement of the imaging modality, an actuation of a light source for illumination of a work area, capture or upload of an image or video, switching an application or an active software program of the display, actuation of a smart glass feature of the system, turn the system off, actuating a voice or a touch control, sending or receiving information or a notification to or from a remote location, initiating a power source alteration or hot swap, movement of a cart comprising the imaging modality on the support, movement of the support, or actuating the imaging modality to a use position or a storage position.

Also in frequent embodiments, the imaging modality is configured for movement relative to the support between a use position and a storage position. Often, the storage position is located within a housing of the support.

Also in frequent embodiments, the system further comprises a light source configured for illuminating at least a portion of the work area optical path such that the image provided for viewing on the display is illuminated. Often, the system further comprises a power source configured to power the system or a component thereof. Frequently, the power source is positioned on or attached to the user wearable frame. Often, the power source comprises a rechargeable battery. Also often, the power source comprises a battery comprising a rechargeable battery or a non-rechargeable battery and the system is configured to hot swap the battery.

In certain frequent embodiments, a kit is provided comprising the wearable optical system, a light source, materials or information for fitting or adjusting the user wearable frame, materials or information for installing or adjusting the support or imaging modality, and a battery.

In certain embodiments, a wearable optical system is provided, comprising: a user wearable frame comprising a centered viewing portion that is viewable by a user via a horizontal optical path; and a vision redirecting mechanism comprised in a manipulatable imaging extension, defining a work area optical path in optical communication with the viewing portion, the horizontal optical path and the work area optical path being different optical paths and the work area optical path is oriented downward at an angle relative to the horizontal optical path, wherein the vision redirecting mechanism or the viewing portion magnifies an image passed through the work area optical path. Also, in frequent embodiments, a wearable optical system is provided comprising: a user wearable spectacle frame or visor; a centered display supported by the frame; and a divergent view camera oriented between about 45° to about 90° below horizontal and comprised in a manipulatable imaging extension and in data connection with the display. In often included embodiments, a wearable optical system is provided comprising: a user wearable spectacle frame or visor; a centered display supported by the frame wherein the display comprises inner and outer portions, and the outer portion comprises electrochromic smart glass; and a divergent view camera comprised in a manipulatable imaging extension and in data connection with the display.

In generally included embodiments, the vision redirecting mechanism is a cantilevered vision directing mechanism. Also often, the viewing portion is comprised in a lens supported by the frame. Frequently, the user wearable frame is adapted to be worn on the head of a user. The viewing portion generally comprises a display. And, the display often comprises an inner surface and an outer surface and the outer surface comprises electrochromic smart glass. Often the display comprises electrochromic smart glass, suspended particle smart glass, liquid crystal smart glass, or nano smart glass. In certain embodiments, the vision redirecting mechanism is a camera supported by the user wearable frame and the camera comprises a 180° camera, a 360° camera, or a machine vision equipped or capable camera. Most frequently, the imaging magnification comprises between about 1.0× to 5.0× magnification of the image, or between about 1.0× to 10.0× magnification of the image. In certain embodiments, the imaging magnification comprises between about 10.0× to 400.0× of the image.

Also in frequent embodiments, a wearable optical system is provided comprising: a user wearable frame; a centered display supported by the frame; and a cantilevered camera supported by the frame in data connection with the display. In certain embodiments, a wearable optical system is provided comprising: a user wearable frame comprising a viewing portion defining a horizontal optical path for the user; and a vision redirecting mechanism that redirects the horizontal optical path to a second optical path defined by a different angle versus the horizontal optical path, wherein the vision redirecting mechanism magnifies an image passed through the second optical path and the horizontal optical path.

Often, the frame comprises an eyeglass frame. Generally, the system further comprises a light source. The light source emits a light signal that is coextensive with an optical path of the imaging modality, or coaxially oriented with the image of the work area. Most frequently, the imaging modality is oriented downward relative to the frame. Often, the system is comprised in a dental operatory system. Also often, the system is in data communication with imaging software or a medical apparatus.

In frequent embodiments of the devices and systems described herein, the imaging modality and/or display is/are voice-controlled. Also frequently, the system is in wireless data communication with imaging software, a laboratory information system, a medical apparatus, and/or an insurance efiling system. In certain embodiments, the imaging modality and/or display is/are remote controlled by the user. Often, the remote control is comprised in a user hand-held tool or device. Also often, the system is used as equivalent to an intraoral camera or extraoral camera for medical or insurance purposes. In frequent embodiments, the display is adapted to provide an image of a written or verbal communication from a remote location. Also frequently, the display is adapted to provide an image from a device or camera positioned remotely to the device. In the most frequent embodiments, the device is connected or connectable with a remote database for accessing or storing images.

In often included embodiments, a method of improving workflow in a dental office, comprising: donning a system by a user, the system comprising a user wearable frame comprising a centered viewing portion that is viewable by a user via a horizontal optical path; and a vision redirecting mechanism comprised in a manipulatable imaging extension and defining a work area optical path in optical communication with the viewing portion, the horizontal optical path and the work area optical path being different optical paths, wherein the vision redirecting mechanism or the viewing portion magnifies an image passed through the work area optical path; imaging a work area with the system; and transmitting data comprising or related to the image to a remote location; or sending or receiving real-time data related to the workflow of the dental office from or to the user.

Generally, the imaging modality or vision redirecting mechanism is cantilevered or comprised in or attached to an imaging extension. Such a vision directing mechanism or imaging modality is frequently a camera. The term "cantilevered," among others, is defined herein.

Often, optical communication comprises data transmission of an image obtained by a camera comprised in the vision redirecting mechanism to the viewing portion. The imaging modality and/or display is frequently in data communication with a database and an imaging software. Often, the data communication or data connection is a wireless data connection, frequently selected from the group consisting of WPAN/Bluetooth, Coexistence, High Rate WPAN, Low Rate WPAN, mesh Networking, Body Area Networks, WiFi, WiMax, RFID, and/or Visible Light Communication.

In frequent embodiments, the viewing portion comprises a display. Often, the display comprises an inner surface and an outer surface and the outer surface comprises smart glass. In frequent embodiments, the display comprises smart glass. The smart glass often comprises a smart glass technology selected from electrochromic smart glass, photochromic smart glass, suspended particle smart glass, liquid crystal smart glass, or nano smart glass. Often, the frame comprises an eyeglass frame. The display is often comprised in an eyeglass lens positioned in the frame. Most frequently, the system further comprising a light source. Often, the light source emits a light signal that is coextensive or coaxially oriented with an optical path of the imaging modality at the position of a work area.

Also frequently, the imaging modality is oriented downward relative to the frame. Often, the imaging modality is oriented between about 70° to about 110° below horizontal. In certain embodiments, the angle is between 80° to 120° below horizontal. In certain embodiments, the angle is between 85° to 95° below horizontal. In certain embodiments, the angle is between 70° to 90° below horizontal. In certain embodiments, the angle is between 60° to 90° below horizontal. In certain embodiments, the angle is about 90° below horizontal. In certain embodiments, the angle is between 60° to 90° below horizontal. In certain embodiments, the angle is between 70° to 90° below horizontal. In certain embodiments, the angle is between 80° to 90° below horizontal. In certain embodiments, the angle is between 46° to 75° below horizontal. In certain embodiments, the angle is between 47° to 88° below horizontal. In certain embodiments, the angle is between 55° to 78° below horizontal. Most frequently, "horizontal" refers to a "horizontal optical path" as that phrase is defined herein.

Often, the imaging modality or vision redirecting mechanism comprises a camera. In certain embodiments, the camera comprises a 180° HD camera. In certain embodiments, the camera comprises a 360° HD camera. Often, imaging modality communicates between about 1.0× to 5.0× magnification of a work area to the display. Also often, the imaging modality communicates between about 1.0× to 10.0× magnification of a work area to the display. In certain embodiments, the imaging modality communicates between about 10.0× to 400.0× magnification of a work area to the display. In certain embodiments, the imaging modality communicates between about 5.0× to 40.0× magnification of a work area to the display. In certain embodiments, the imaging modality communicates between about 5.0× to 30.0× magnification of a work area to the display. In certain embodiments, the imaging modality communicates between about 5.0× to 20.0× magnification of a work area to the display. In certain embodiments, the imaging modality communicates between about 3.0× to 1.0× magnification of a work area to the display. Optical zoom and/or digital zoom technology is often used to provide magnification.

The system is often comprised in a dental operatory system. In frequent embodiments, the device is in data communication with imaging software or medical apparatus. Often, the device is in wireless data communication (e.g., WPAN/Bluetooth, Coexistence, High Rate WPAN, Low Rate WPAN, mesh Networking, Body Area Networks, WiFi, WiMax, RFID, other wireless networks, Visible Light Communication, etc.) with imaging software, a laboratory information system, a medical apparatus, and/or an insurance efiling system. The medical apparatus is often any medical apparatus capable of or adaptable to be in data communication (wired or wireless) with the devices or systems contemplated herein. In certain embodiments, the medical apparatus comprises a dental crown milling machine, or inlay, only, crown, or veneer machine.

The imaging modality, display, and/or viewing portion is/are often voice-controlled. Voice control often controls data import and data export. In certain embodiments, the voice control is provided in a manner that permits the user to perform voice-to-text commands or operations. Often, a microphone is provided in the system or device to assist with voice control and such a microphone is positionable or positioned in close proximity to the mouth of the user while the system is worn by the user and in operation.

In frequent embodiments, the display and/or viewing portion comprises inner and outer portions, and the outer portion comprises a smart glass shading technology ("smart glass technology" is often referred to herein as smart glass for simplicity). Often, the smart glass shading technology is controlled by voice-command or remote actuation by the user. Often, the smart glass technology comprises electrochromic smart glass, photochromic smart glass, suspended particle smart glass, liquid crystal smart glass, or nano smart glass technology.

In frequent embodiments, the imaging modality, display, and/or viewing portion is/are remote controlled by the user. Often, the remote control is comprised in a user hand-held tool or device. In certain embodiments, the remote control is positioned in a dental mirror. In certain embodiments, the remote control is positioned on the body of the user or in another location where the remote control can be controlled by the user or another person. In certain embodiments, system or device controls are positioned on the system or device, for example, on the frame or housing of the system or device. In certain embodiments, a touchpad is provided on the system or device for operation of system or device controls. The touch device is, in certain frequent embodiments, equipped to provide haptic input and/or output information relative to touch-based use by the user.

In frequent embodiments, the device is used as equivalent to an intraoral camera or extraoral camera for medical or insurance purposes. Often, the display is adapted to provide an image of a written communication from a remote location. Also often, the display is adapted to provide an image from a device or camera positioned remotely to the device. In frequent embodiments, the device is connected with a remote database for accessing or storing images. In certain frequent embodiments, a dental system is provided comprising a wearable optical device described herein claim in data communication with a storage database and imaging software.

In certain embodiments, a tracking algorithm, software, or firmware is included with the system. Also, in certain embodiments, the imaging modality is adapted to provide visual tracking to focus on a work area in an automated manner. Often, in such embodiments, the tracking comprises identification of a feature of a work area or identifier such as a fiducial or other marker to identify a portion or a boundary of a work area. In certain related embodiments, the imaging modality or housing for the imaging modality is weighted such that the camera is oriented in a specific manner within a degree of movement or wobble of the device or cantilever. So, if the device or head of the user is rotated or moved in a certain direction, the relative angulation of the camera toward the work area is not affected or stays relatively stable and directed at and maintaining a line of sight to the work area. Often, the work area is a mouth or surgical site of a subject.

Methods of using wearable optical devices described herein are also frequently provided. In frequent embodiments, the methods involve improving the posture or ergonomic positioning of the user. Devices described herein are directed toward, inter alia, improving the ergonomic environment of the user.

In frequent embodiments, the support comprises an eyeglass frame, face mask, helmet, a headband and visor device, or apparatus otherwise adapted to be worn on the head of a user, or an apparatus adapted to be worn within the line of vision of a user. Often, the device further includes a light source such as an LED light source, a tungsten halogen light, a plasma arc curing light, and/or a laser. Often the light source is attached to the support or the housing. Often, the light source emits a light signal that is coextensive with the first or second path of the optical path. Also often, the light source emits a light signal in the visible spectrum, though dental curing lights, ultraviolet, and laser lights are also often incorporated in certain embodiments. In general, the light source is incorporated in a manner that reduces or eliminates shadowing on a work area or at the end of the focal length. Frequently, the optical path defines a focal length. In certain embodiments, the angle of the second path of the optical path is adjustably variable relative to the angle of the first path of the optical path.

Most frequently, the frame or head attachment portion is adapted to be positioned on a head of a user. In frequent embodiments, the head attachment portion is adjustable to be tightened or loosened. Tightening and loosening is provided to adapt the head attachment portion to fit a specific user of the device to that it may be worn by the user in a securely attached manner. Also in frequent embodiments, the device comprises a protective shield or a protective coating on a shield, or other portion of the device, lying within a light path between the user and the work area.

Also frequently, the devices described herein further comprise a light source for illuminating a work area. Often, the light source emits a light signal that is coextensive with the first or second direction of the light (e.g., optical path). Also often, the light source emits a light signal in the visible spectrum, though dental curing lights, ultraviolet, and laser lights are also often incorporated in certain embodiments.

Often, the device further comprises a power source. Often, the power source comprises a battery. Less frequently, the power source is connected using an external cord. Often, the power source comprises a removable battery. Frequently, the power source is positioned on the head attachment portion. Also frequently, the power source is rechargeable. Often, the power source is operated using a switch positioned on the device. Also often, the switch is a capacitive sensor.

The device or system often comprises a speaker (e.g., in an ear-piece) and/or a microphone for reception and transmission of an auditory information such as a communication or a signal. Often, the communication or signal cues the device or system to display or transmit an image. Also often, the communication or signal cues another device to begin, modify, or cease operation, or to do something in particular such as transmit data. The other device is often a remote device, for example a remote device within or remote from a dental or surgical operatory or a work area. As used herein, the term "data" encompasses auditory information.

The device or system is often utilized in the jewelry trade, geology, gemology, watchmaking, photography, laboratory technicians, collectors, printing, dentistry, surgery, biology, chemistry, education, meteoritics, electronics, manufacturing, fabrication, tattooing, ophthalmology, dermatology, reading, drone operation, writing, law enforcement or military, home images or videography, and/or professional videography.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
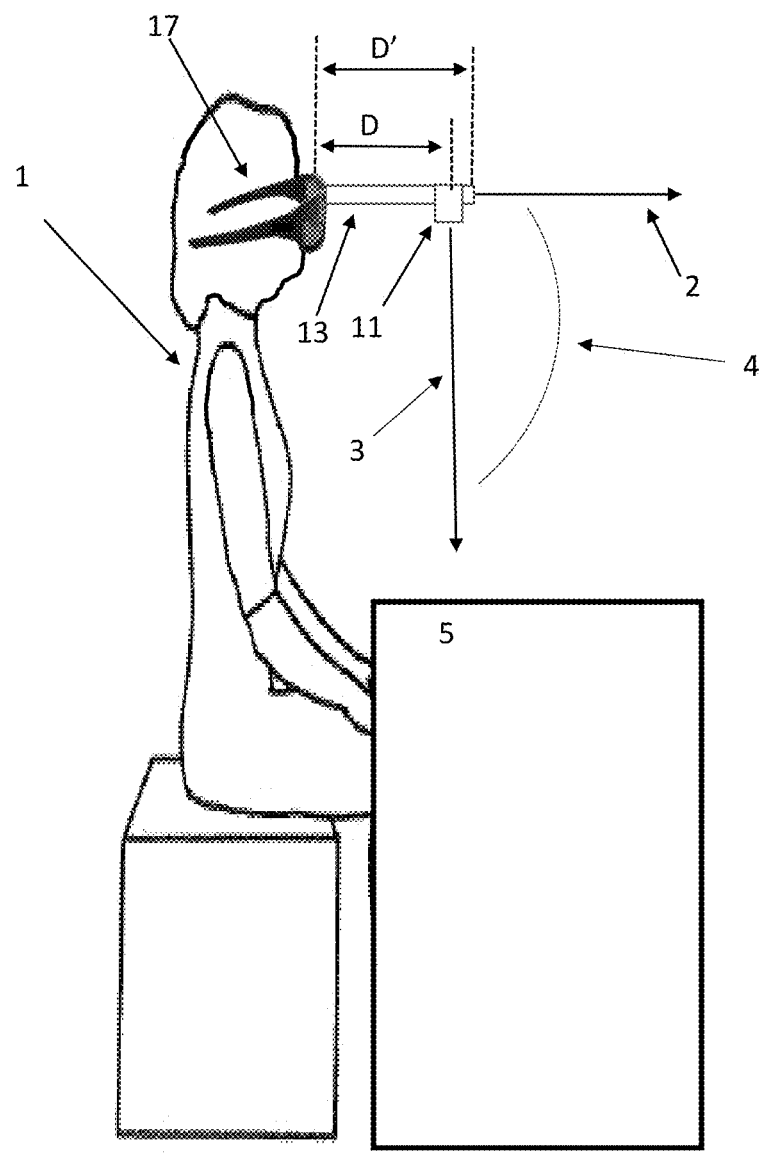
FIG. 1 depicts a seated person and an exemplary optical path alteration wearing a device of the present disclosure.

The features of the presently disclosed solution may be economically molded or assembled by using one or more distinct parts and associated components which, may be assembled together for removable or integral application.

Unless defined otherwise, all technical and scientific terms used herein have the same meaning as is commonly understood by one of ordinary skill in the art to which this disclosure belongs. In some cases, terms with commonly understood meanings are defined herein for clarity and/or for ready reference, and the inclusion of such definitions herein should not necessarily be construed to represent a substantial difference over what is generally understood in the art. If a definition set forth in this section is contrary to or otherwise inconsistent with a definition set forth in the patents, application, published applications and other publications that are herein incorporated by reference, the definition set forth in this section prevails over the definition that is incorporated herein by reference.

All patents, applications, published applications and other publications referred to herein are incorporated by reference in their entirety, or the specific reason for which they are cited.

As used herein, "a" or "an" means "at least one" or "one or more."

As used herein, the term "and/or" may mean "and," it may mean "or," it may mean "exclusive-or," it may mean "one," it may mean "some, but not all," it may mean "neither," and/or it may mean "both." As used herein the term "or" is not exclusive of the term "and."

The use of the term "embodiment" means that a particular feature, structure, or characteristic described in connection with the embodiment is included in at least one embodiment of described subject matter. As such, the appearance of the phrases "in one embodiment" or "in an embodiment" throughout the present disclosure is not necessarily referring to the same embodiment. Furthermore, the particular features, structures, or characteristics may be combined in any suitable manner in one or more embodiments.

As used herein, "user" refers to an animal, including, but not limited to, a primate (e.g., human). Generally, a "user" refers to a person wearing, in the process of donning, and/or operating a system or device described herein.

As used herein, "work area" refers to an area, object, or thing to be viewed by a user, or a portion thereof; most frequently using the devices of the present disclosure. In frequent embodiments, the work area comprises a mouth or surgical site of a subject.

As used herein, "line of sight" or "line of vision" refers to a view of a work area by a user. Line of sight may also be referred to as the shortest distance between an eye of a user assuming an ergonomically correct posture and a work area while accounting for any equipment worn by the user intended to re-direct the vision of the user. For example, equipment worn by the user intended to re-direct the vision of the user (e.g., devices described herein) may cause the line of sight to have a longer distance than a direct line between the eye of the user and the work area by virtue of the vision of the user being directed through the equipment, for example, cantilevered imaging modalities.

As used herein, "imaging extension" refers to a forward extending portion of the present devices that supports and positions an imaging modality at a selected distance (e.g., depicted as distance "D" or "D'") in front, or forward, of the head (including parts thereof) of a user of the devices or a portion of the device supporting the imaging extension. An imaging extension is intended to include at least a support and an imaging modality. An imaging extension is most frequently cantilevered.

As used herein, "imaging modality" refers to imaging such as digital imaging utilizing a sensor or camera or other device capable of capturing images (including videos and/or other representations or depictions, including 3D images, or digital images) of a work area. Machine vision capable, equipped, or connected cameras are contemplated. HD-capable or high/enhanced-pixel count capable cameras, and the like are often preferred.

As used herein, "system" refers to an optical device of the present disclosure optionally in addition to hardware, software, firmware, and/or other components (e.g., a camera) in optical, data, and/or auditory communication with the optical device.

As used herein "cantilevered" refers to physical positioning of an imaging modality or imaging extension in a manner that provides or enhances the ability of a user of the device to assume a proper ergonomic posture. In general, "cantilevered" refers to positioning the imaging modality extended in front, or forward, of the head (including parts thereof, such as the eyes, forehead, or face) of the user (e.g., depicted as distance "D" or "D'" in certain depicted embodiments). A cantilevered imaging modality (e.g., camera), for example, is positioned, and may optionally adjust, on a horizontal and/or vertical plane extending forward from the user so that optimal ergonomic positioning and optimal viewing of the work area may occur. For clarity, the term "cantilevered" is not intended to refer to any specific or particular physical or structural manner, arrangement, or placement of an imaging modality and is intended merely to refer to the nature of the positioning.

As used herein, "optical path" refers to a straight path through which an image is transmitted, e.g., to a user.

As used herein, "optical communication" refers to communication of an image along an optical path, or between two or more different optical paths. Optical communication of an image (e.g., a work area) can be through lenses, mirrors, prisms, or transmitted through electronic means such as a digital camera, electronic data transmission (including wired or wireless communication), and display of the image. For example, optical communication may refer to two optical paths that intersect (e.g., a work area optical path and a horizontal optical path), or transmitting an image from one optical path (e.g., a work area optical path) to a display or second optical path (e.g., horizontal optical path), or other communication of an image.

As used herein "magnify," "magnifies," magnification," and "magnifying" refers to enlarging an image, e.g., versus naked eyesight when viewed at a certain distance.

As used herein, "viewing portion" refers to a portion of an optical device of the present disclosure viewed or viewable by a user when wearing the optical device, such as a lens, mirror, screen, display, or other portion or area of, or defined by, the device. For ease of reference the viewing portion is often referred to herein as a "display." As such, both "viewing portion" and "display" encompass near-eye and other head-mounted digital displays and user-viewable related viewable technology capable of displaying still and moving images and streaming video. Generally, such a viewing portion is viewable when the user is looking directly ahead, e.g., via a horizontal optical path.

As used herein, "horizontal optical path" refers to the optical path from an eye of a user looking straight out in an "eyes-centered" orientation, for example, as depicted in aspect 2 of FIG. 1. The horizontal optical path, generally, bisects an upper, lower, and lateral visual planes.

As used herein, "work area optical path" refers to an optical path with a "work area" being one end-point of the optical path. According to the present disclosure, the work area optical path is generally in optical communication with a horizontal optical path, display, or viewing portion. Using devices of the present disclosure the work area optical path often comprises the line of sight, defined herein.

As used herein, "eyes-centered" refers a median or natural meridian and longitude orientation of the pupil of an eye of a user. For context, often an "eyes centered" position is understood herein to be opposed to an eye position where the user is looking down or up. A "centered viewing portion" or "centered display" refers to a viewing portion or display that is viewable by a user via a horizontal optical path or when the viewer assumes an eyes-centered orientation. Displays and viewing portions contemplated in systems and devices herein are generally centered displays or centered viewing portions.

As used herein, "user wearable" refers to a device to be worn by a user. Most typically, user wearable refers to a device or system to be worn, at least in part, on the head of a subject.

The present disclosure provides devices that permit the user to assume an ergonomically correct, upright posture while not compromising visual acuity or magnification. When donning optical loupes there is a tendency to bend at the neck, back, and/or shoulders to move closer to the work area. Also often, assuming such a contorted posture is dictated by the focal length of the chosen magnifying mechanism. The user must bend and move within the focal length of the chosen loupe, e.g., typically 15-18 inches. Bending at the pelvis, neck, or with pelvis and neck causes excessive strain on the human body, particularly the back, neck, and shoulders. When conducting repetitive movements or movements that require moving a person's head up and down or simply maintaining head weight in a static position while bent at the neck and/or pelvis such as those required in common dental, examination, and surgical procedures, these strains are magnified over time.

According to the present disclosure, in the case of a dental procedure as one exemplary use, traditional seating arrangements can be maintained for both the patient and the subject while permitting the user to sit in a neutral position with a straight back and neck, thus reducing fatigue and strain. The optical devices described herein not only permit, but often require, the user to sit properly upright in order to maintain the proper optical pathway to the work area. In certain embodiments, the angulation of vision redirection is adjustable such that the posture of the user may vary from an upright or reclined position to a bent-forward position or the device may be placed at other locations on the head or body of the user. For example, if a horizontal line of sight is maintained, the optical device focuses the vision of the user at an optimal angle and focal length toward the work area. Bending down at the neck or back by the user would frequently inhibit this optimal angle and consequent view of the work area.

Though medical procedures are described or contemplated herein such as general and specific in-office or operating room surgical procedures and dental procedures that benefit from a magnified view of a work area, a variety of additional usages for the technologies described herein are contemplated. For example, the jewelry trade, geology, gemology, watchmaking, laboratory technicians, photography, collectors, printing, dentistry, surgery, biology, chemistry, education, meteoritics, electronics, manufacturing, maintenance, research, fabrication, tattooing, ophthalmology, dermatology, reading, writing, law enforcement or military, home images or videography, and/or professional videography, among a variety of other usage areas. The imaging modalities described herein, for example, have significant utility in the media and entertainment arenas.

In one example, readers and users of mobile devices often have to bend their heads downward to view the page or screen. Often, such people desire to or must wear reading glasses to do so. This may be particularly true for mobile device users as mobile devices continue to have increasingly higher resolutions, permitting increasing amounts of information on a small screen. The present devices permit such people to view papers, books, devices or other things without having to assume an ergonomically awkward position by bending downward at all. For example, according to the present devices and methods, a user can relax in an airplane seat with their head comfortably resting against the headrest, looking forward, having a book comfortably lying in their lap in privacy, and having their arms comfortably resting at their side, while having full view of the book on their lap. In addition, mobile device users can, for example, view video, or read on their mobile device while sitting anywhere in this comfortable manner. Including magnification levels appropriate for corrective vision, reading or viewing high-definition mobile device screens is contemplated. In certain embodiments, the magnification of the devices is linked to the screen resolution of the mobile device to provide optimal magnification to comfortably view items displayed on the mobile device screen.

The present devices also ease eye strain. Prior devices require the user to move their eyes to face downward (e.g., declination of the eye or declination angle) to view through a downward angled loupe. In contrast, the present devices permit the user to assume a comfortable eye position, looking forward (e.g., horizontally forward) rather than downward while being able to clearly view a work area positioned below the eye level of the user.

FIG. 1 depicts a person (1) in a seated position looking horizontally forward (2) with a straight neck, shoulders, and back. In this depiction, the person 1 is wearing an exemplary device 17 of the present disclosure having a support 13 and an imaging modality 11. Angle (4) defines an angulation of the optical path (3) to permit the person (1) to see object (5) without having to bend at the neck, shoulders, or back while continuing to look forward. Distance "D" is depicted as representative of the horizontal positioning distance of the imaging modality 11 relative to the front of the eyes of the person 1 or the frame 17 of device/system worn by the user. Distance "D'" is depicted as representative of the maximum travel movement provided for the imaging modality 11 on support 13. In embodiments where imaging modality 11 is not movable or adjustable on support 11, distance D and distance D' are the same. Distance D is generally at least a few inches, most frequently about or more than 5 inches, and often preferably longer.

With further regard to FIG. 1, object 5 often comprises a work area and therefore may be an object, person, or anything else that is viewable using the devices/systems of the present disclosure. In this exemplary depiction, the angle 4 is about 90°. As can be seen, object 5 is viewable from a vertical position through a device 17 worn by the person, while the person maintains an ergonomically correct position (e.g., straight neck, back, relaxed shoulders, and level head) despite the person 1 sitting back and away from the object 5. As is indicated, and is the case for all embodiments described herein, optical path 3 from the imaging modality 11 toward the work area (object 5) does not extend from the naked eye of person 1, but instead is situated to begin/end having one end at distance D and the other end at a work area or object 5. Optical path 3 from imaging modality 11 is not directly viewable by the person 1 absent the imaging modality cantilevered at distance D. In the depicted embodiment, as in the most frequent embodiments described herein, this horizontal positioning distance D is provided by way of a cantilevered imaging modality, cantilevered on a support comprising an imaging extension. As described herein, distance D can be variable. For example, in frequent embodiments, distance D ranges from 4-24 inches.

The devices of the present disclosure includes a light source for illuminating a work area. LED light sources are frequently provided. One or more lights may be provided each having variable or different strengths, positions, or angulations. Often, the light emits a light signal in the visible spectrum, though other light sources are contemplated having additional functionality, such as curing resins and composites, activating photosensitive materials present in the work area, or deactivating photosensitive materials present in the work area. As such, a different or an additional light source can be incorporated in the same or different location on the device or cantilevered extension thereof such as an ultraviolet light, a quartz-halogen light, a laser, a plasma arc curing light, an LED light, or other light known in the art. Regardless of the light source on the device, if the user operates a light source whose emissions may injure the eyes of the user, it is often important to include a shield or smart glass technology that protects the user's eyes from such emissions. A removable or movable shield may be provided on or with the device, or smart glass that provides a blockage or reduction of damaging light from passing through to the user. In embodiments where the display prohibits sight therethrough, the signal passed through to the user from the camera (e.g., 180° or 360° camera) frequently protects the eyes of the user by blocking incoming damaging light and only passing through a filtered and nondamaging signal to the display.

High accuracy of the illumination signal direction to match the location of the imaging or work area that is being viewed through the imaging modality is often provided. In dental applications, for instance, having the light signal (also referred to as illumination signal) closely match the optical path provides both accurate imaging and less discomfort for the patient. In such circumstances the light signal from the device often will not extend outside of the work area viewed through the optical path to encompass the eyes of the patient. In addition, effective and specific lighting provided by the device obviates the need for overhead lights in the dental studio or operatory, which can also be uncomfortable for patients. Shadowing produced by an ineffectively oriented illumination source can cause difficulties in imaging dark or shrouded areas such as within the mouth of a patient. As such, the present devices avoid shadow production with the orientation of the illumination signal as coextensive with the optical path. Often, such coextensive or coaxial orientation of the illumination signal is provided at the same or similar angle as the viewing angle.

A variety of magnification levels are contemplated for the presently described optical devices. For example, the device often imparts between about 1.0× to about 8.0× magnification. Often the magnification level is 0.5×, 1.0×, 2.0×, 3.0×, 4.0×, 5.0×, 6.0×, 7.0×, 8.0×, 9.0×, or 10.0×. Enhanced magnification levels may often be achieved through, for example, the use of a high-definition (HD) camera and digital zoom technologies to provide magnification well beyond 10.0× magnification, for example, about 20×, 30×, 40×, 50×, 60×, 70×, 80×, 90×, or 100× undeteriorated magnification. Optical zoom technologies are also often employed to provide an undeteriorated image. In certain embodiments, magnification of up to about 150×, 200×, 250×, 300×, 350×, or 400× is provided using an HD camera, optical, and/or digital zoom. Often, the magnification level of an optical device is selected based on the optical loupe for which it is intended to attach to provide the same or greater level of magnification provided by the optical loupe, most often along a longer focal length.

Frequently, assuming a proper ergonomic posture is mandated through the use of optical devices of the present disclosure. In such embodiments, the user achieves an optimal viewing angle of a work area while keeping their head upright and looking forward. Simply looking forward through the optical device provides an angulation of the line of sight of the user around an optic axis downward toward the work area.

For devices described herein, proper angulation of the line of sight is often dictated by the body type of the user, including accounting for arm length, torso length, neck length, head height, etc.; in addition the relative distance of the work area from the head of the user may be evaluated. In general, angulation of the line of sight varies between about 80 degrees to about 90 degrees versus a horizontal line of sight. Often, the angulation is about 70 degrees to about 110 degrees. Also often, the angulation is about 90 degrees. The angulation is often about 70, about 75, about 80, about 85, about 90, about 95, about 100, about 105, about 110 degrees versus a horizontal line of sight. As the increments above are listed in 5 degree increments, it is expected that the use of the term "about" refers to an angulation variability that accounts for the specifically listed degree in addition to the range between degree increments.

Adjusting focal lengths versus the focal length of an existing optical loupe is occasionally necessary due to the further distance of the user from the work area when used in an ergonomically correct position. As such, in certain embodiments this lengthened focal length is achieved by way of an additional magnification, for example a lens, which is provided in the optical device. Where an existing focal length is 18 inches, for example, the focal length may be lengthened by, for example, 6-20 inches, or 10-30 inches to provide a focal length of between 24 inches and 48 inches. The focal length often varies between about 18 inches to 60 inches. The focal length may be longer. As such, the focal length will generally increase by a certain determinable factor, which could be about 1.0×, about 1.1×, about 1.2×, about 1.3×, about 1.4×, about 1.5×, about 1.6×, about 1.7×, about 1.8×, about 1.9×, about 2×, about 2.1×, about 2.2×, about 2.3×, about 2.4×, about 2.5×, or longer, versus the existing focal length of the loupe prior to including the optical devices of the present disclosure. As with the angulation discussed above, the use of the term "about" refers to a focal length distance variability that accounts for the specifically listed distance in addition to the range between distance increments.

Focal length is the distance from the eyes to the work area or object. In certain embodiments, a discrepancy of small distances in designed focal length versus how the devices are utilized (i.e., the actual use distance) can cause eye strain to try to focus.

It is frequently preferred to select a focal length to match the activity that is to be undertaken using the devices described herein. As such, related measurements to determine optimal focal length often occur in the environment where the activity is to take place. Such measurements are often taken using known parameters to ensure proper posture of the user relative to the work area.

The devices contemplated herein may have a distance accounting for a depth of field or working range to ensure that multidimensional work areas are in focus across the entire work area. Often, magnification has an effect on the depth of field or working range such that larger magnifications provide for a smaller depth of field or working range.

In the devices discussed herein any of a variety of usability and personalized features may be included. For example, the line of sight angulation is often customizable on the fly or when the device is removed. For example, fine angulation correction or modification is often provided such that when the optical device is used, the line of sight angulation (e.g., downward angulation relative to a horizontal optical path) may be changeable by the user within an often predetermined range, e.g., 0.1-45 degrees or across a 20-90 degree range, or a 35-90 degree range, or a 45-90 degree range, or a 45-100 degree range, or a 50-80 degree range. A variety of mechanisms are used for customization, including ratcheting mechanisms, friction based rotation, flexible fittings, screw fittings, bolts, clamp-fittings, etc. In certain embodiments, a flexible or rigid light pipe is provided. Often, though it is not required in certain embodiments, an easy to use mechanism is provided to permit angulation customization such as a dial, handle, or similar device. Another frequent feature is a light such as an LED to provide an optimal viewing environment. Contemplated lights are often center-mounted or mounted on or near the outside of the frame holding the device. In certain embodiments, light is provided through the same pathway as the optical pathway of the user such that light passes through the optical system of the device.

As the ergonomic optical loups are intended to be worn on the head of a user, small size and/or light weight are important. Plastic optical elements are often preferred to reduce weight, though glass elements may also be used. Overall, optimal visual acuity is maintained through the use of plastic and/or glass optical elements. The device is often adapted to account for any additional weight or leverage caused by the line of sight angulation elements such that it is weighted to sit evenly on the user's head.

The vision redirection angulation may be variable along angle "R," between different redirection positions (19, 20). Angle "R" is variable and is represented as a straight line, but "R" refers to the angle created between redirection positions (19, 20). Though redirection in a 90 degree angle (20) and another angle (19) is depicted, the vision redirection may vary over a larger range as discussed herein (e.g., greater than 0 degrees to about 180 degrees) while the user maintains an ergonomic position with eyes facing directly forward from the head of the user (e.g., a horizontal optical path or an eyes-centered position).

Figure 2:
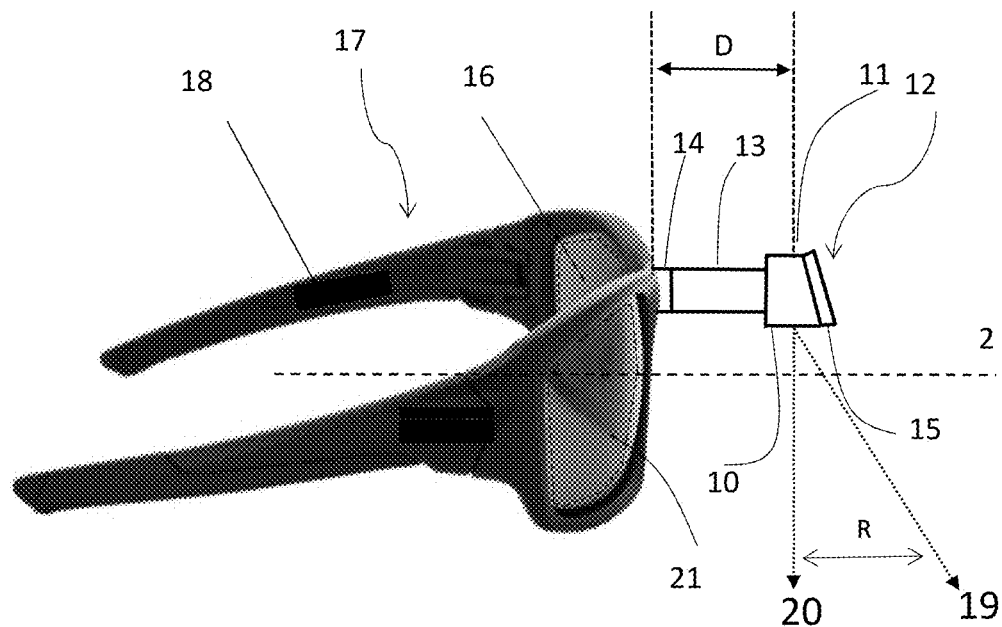
FIG. 2 depicts a side view of an exemplary vision re-directing device.

FIG. 2 provides a basic diagrammatic representation of an exemplary optical device (17) of the present disclosure. Such a device has a frame (18) for supporting the various features of the device. While the frame may be arranged similar to a pair of spectacles, it may be provided in a variety of formats such as a spectacle frame, visor, helmet, hat, goggles, or other format. Attached to the frame (18) is the imaging extension (12). The imaging extension (12) extends forward of the frame in a position that provides an enhanced viewing angle of the work area. Distance "D" is depicted as representative of the cantilevered positioning distance of the imaging modality 11 from the front of the frame 18. Distance D may be variable (via automated or manual positioning of imaging modality 11) or static. As part of the imaging extension (12) a connection (14) and a support (13) are provided to attach the imaging modality (11) to the frame (18). The imaging modality (11) is cantilevered from the device on the imaging extension (12). The imaging modality (11) is most frequently, therefore, referred to herein as a cantilevered imaging modality or cantilevered camera. The connection (14) may be rigid or manipulatable, referring to whether it provides the capability to move or adjust the support (13) and/or imaging modality (11) in one or more directions. If the connection (14) is of the manipulatable variety, it is often provided such that the support (14) can be adjusted vertically and/or horizontally. The support (14) can also be provided in rigid or extendable forms, e.g., along distance "D". In an extendable form, the support (14) can be adjusted to be shorter or longer to bring the imaging modality (11) closer to the frame (18) or user or to extend the imaging modality (11) further from the frame (18) or user. The imaging modality (11) is optionally movable along support (13) along distance "D." In certain embodiments, there is no obvious or mechanical distinction between the connection (14) and the support (13) such that the support (13) is extendable or rigid, and/or is rigid or adjustable in the vertical and/or horizontal planes without a separate connection (14). Support (13) can be extendable through any variety of adaptations, alternatively, imaging modality (11) may be movably mounted on support to slide or move between, or attach at, different positions of support (13). The imaging modality (11) in the present embodiment includes an imaging surface (10) and a light source surface (15) including a light source (24, FIG. 4A) such as an LED.

As depicted in FIG. 2, the imaging modality (11) is a downward facing, or work area facing, imaging modality (11). A prism, for example, is not utilized to re-orient a horizontal-facing camera in the most frequent embodiments. Rather, the lens of an imaging modality is most frequently physically-oriented in a downward manner. Moreover, the imaging modality (11) is extended or cantilevered in front of the user to aid in providing an optimal view of the work area while the user is able to assume an ergonomically-correct posture. In the most frequent embodiments, the camera is the imaging modality (11) and it is oriented such that it faces downward from a horizontal plane, in a different direction than the direction of the user's sight direction. Stated differently, most frequently, the camera is oriented such that it faces a different direction than the view directly from the eyes of the user. For example, where the user is looking horizontal, the camera is facing downward toward a work area such as the mouth of a patient, or a surgical area.

The imaging surface (10) and/or light source surface (15) can be oriented facing downward, angled, or horizontal, for example as depicted in FIGS. 2, 3, 4B, and 5. In general, the path of light emitted from the light source (207) is parallel or coaxial with the imaging path such that light from the light source strikes and illuminates the imaged work area. The imaging modality (11) may also be mounted on the support in a fixed or adjustable manner, for example, to adjust imaging toward or on a work area.

As also depicted in FIG. 2, the frame (18) includes lenses having outer (21) and inner (16) surfaces. The display (dotted lines in item 21) is embedded within the lens, attached to the lens, or suspended near the inner (16) surface of the lens. In certain embodiments the display is inner (16) surface of the lens. As is depicted, inner surface (16) of the lens is a centered display; this display is viewable by the user when wearing the device via a horizontal optical path. The outer (21) surface of the lens often comprises a smart glass technology, as further described herein, to provide manipulatable clear viewing or light entry or opacity, shading, or light blockage to the eyes of the user. In certain embodiments, a shade may be attached over the outer (21) surface of the lens to limit light entry to the eyes of the user. When smart glass technology is utilized, it is often provided in laminate form or the smart glass forms at least a portion of the lens material.

Figure 3:
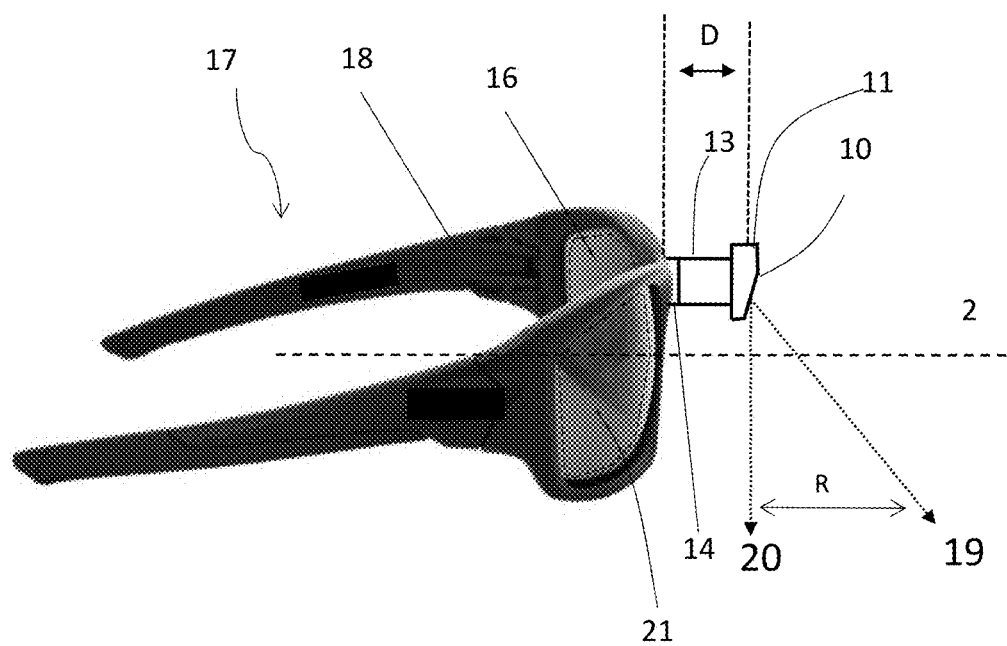
FIG. 3 depicts a side view of another exemplary vision re-directing device.

FIG. 3 provides another depiction of an exemplary optical device. In this device, the imaging modality (11) has an imaging surface (10) that is angled forward to provide a more forward angle for imaging a work area. Though it is not specifically depicted in this view, such an embodiment generally includes a light source as well. Distance "D" is depicted as representative of the cantilevered positioning distance of the imaging modality 11 from the front of the frame 18. Distance D may be variable (via automated or manual positioning of imaging modality 11) or static.

As depicted in FIGS. 2 and 3, the optical path redirection can be varied, for example along angle "R," between different redirection positions (73, 74). An exemplary horizontal optical path (dotted line 20) is provided in FIGS. 2 and 3 for reference purposes. The embodiments represented by the Figures are represented as a pair of spectacles for exemplary purposes only. Such embodiments can be provided in different user-wearable formats and orientations, and may also be provided with any of the variety of optical device features contemplated herein.

Figure 4A:
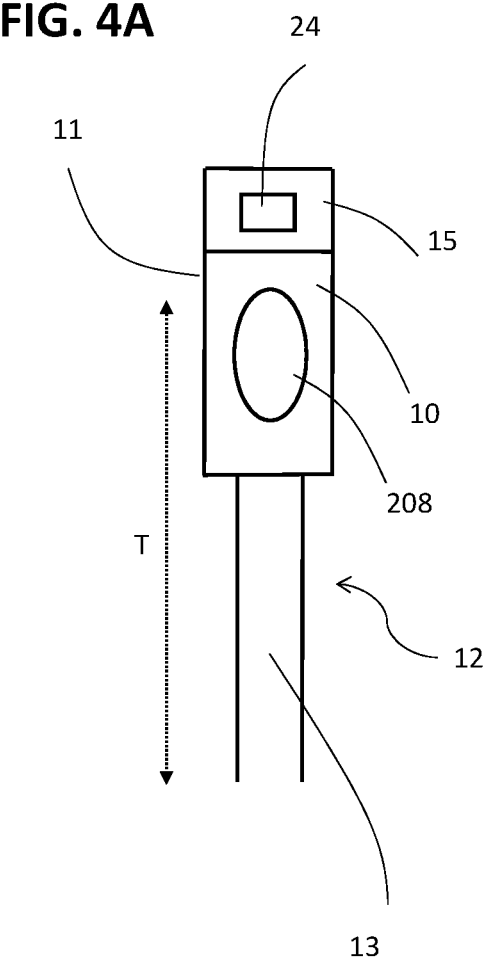
FIG. 4A depicts a plan view of the bottom, looking up, of a portion of the imaging extension of the device of FIG. 3.

FIG. 4A depicts the underside of the imaging extension (12) of FIG. 2. A camera (208), such as an HD camera or other cameras described herein, is provided within the imaging surface (10). The camera is provided in data communication with an imaging system also contemplated herein, often via wireless data connection (e.g., WPAN/Bluetooth, Coexistence, High Rate WPAN, Low Rate WPAN, mesh Networking, Body Area Networks, WiFi, WiMax, other wireless networks, Visible Light Communication, etc.), though corded connection is also contemplated. The imaging modality (11) also includes a light source surface (15) containing a light source (207) such as an LED. The light source (207) illuminates at least a portion of the work area. Though a single light source (207) is depicted, multiple light sources may be provided. Multiple light sources may be the same type of light source or different types of light sources to provide added functionality such as imaging dyes or markers, curing resins, viewing types of dental or oral features or defects, among other functions. The light source (207) most frequently is powered by a dedicated power source such as a battery and is wireless. In other embodiments, the light source (207) and the imaging modality (11) are powered by the same power source. In either implementation, the power source is generally on-board the device and not provided in a corded manner such that the cord is visible, appended to a belt-secured battery, or separate from the device.

Figure 4B:
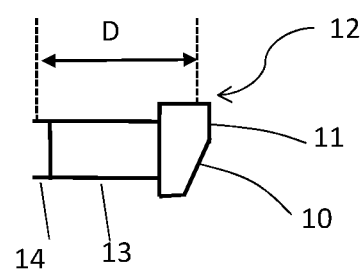
FIG. 4B depicts a side view of a portion of another exemplary imaging extension embodiment.
Figure 5:
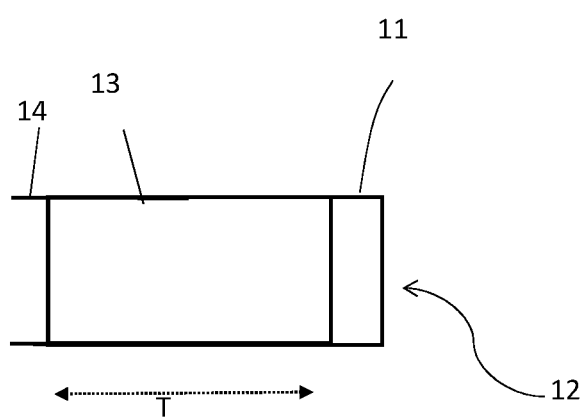
FIG. 5 depicts a side view of a portion of another exemplary imaging extension embodiment another exemplary imaging modality.

FIGS. 4B and 5 provide additional views of alternative imaging extensions (12). Though they are not specifically depicted in these views, such embodiments generally include light sources as well. Distance "D" is depicted as representative of the cantilevered positioning distance of the imaging modality 11 from the front of the frame 18. Distance D may be variable (via automated or manual positioning of imaging modality 11) for example along the directions of arrow "T," or static.

Figure 6:
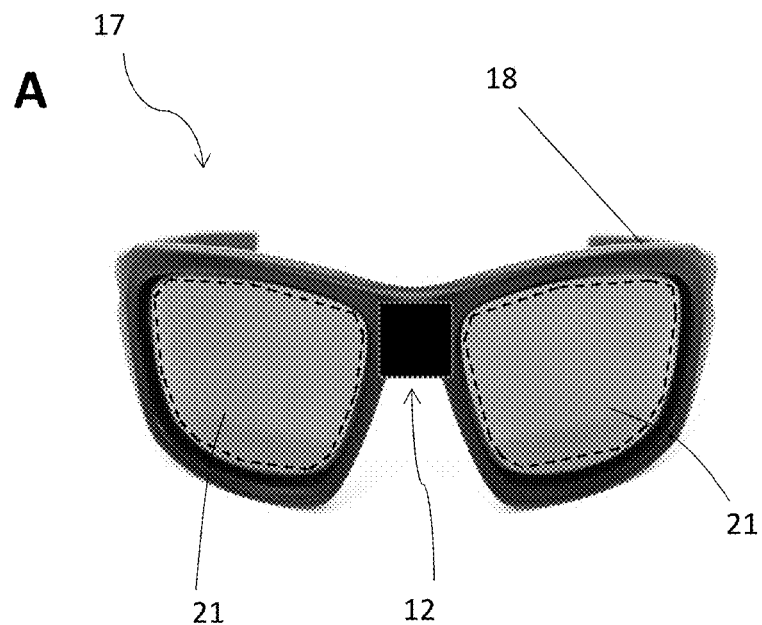
FIG. 6 depicts a front view of another vision re-directing device embodiment.
Figure 7:
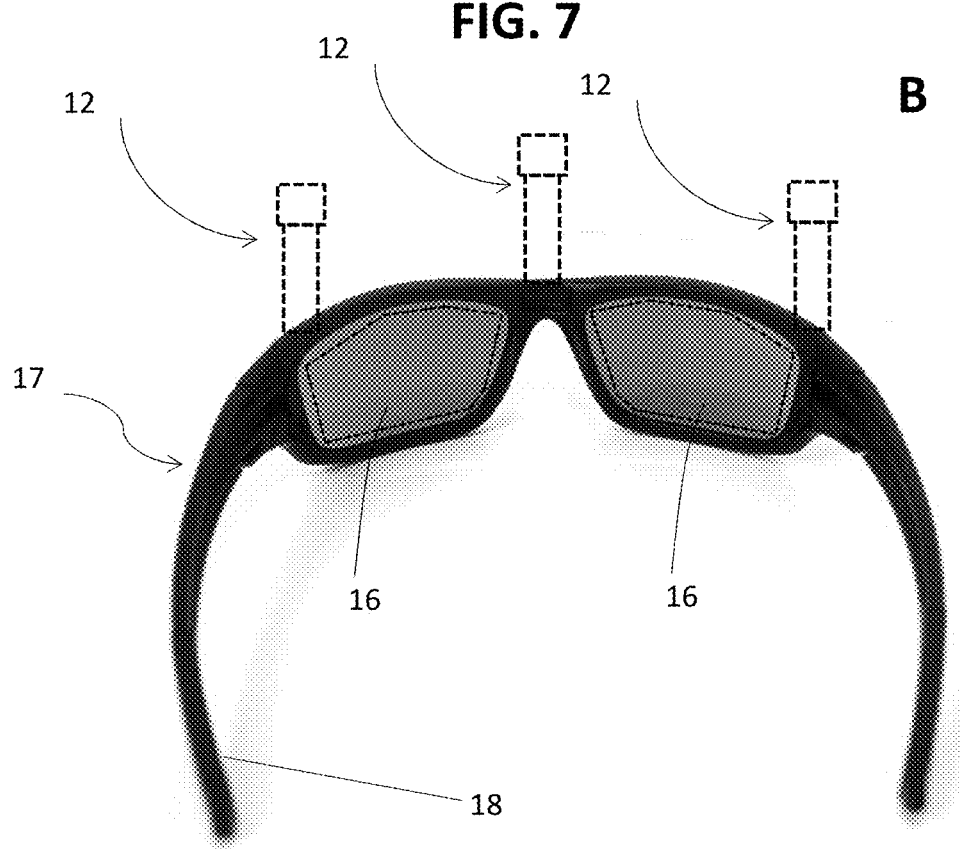
FIG. 7 depicts a rear view of an exemplary vision re-directing device embodiment.
Figure 8:
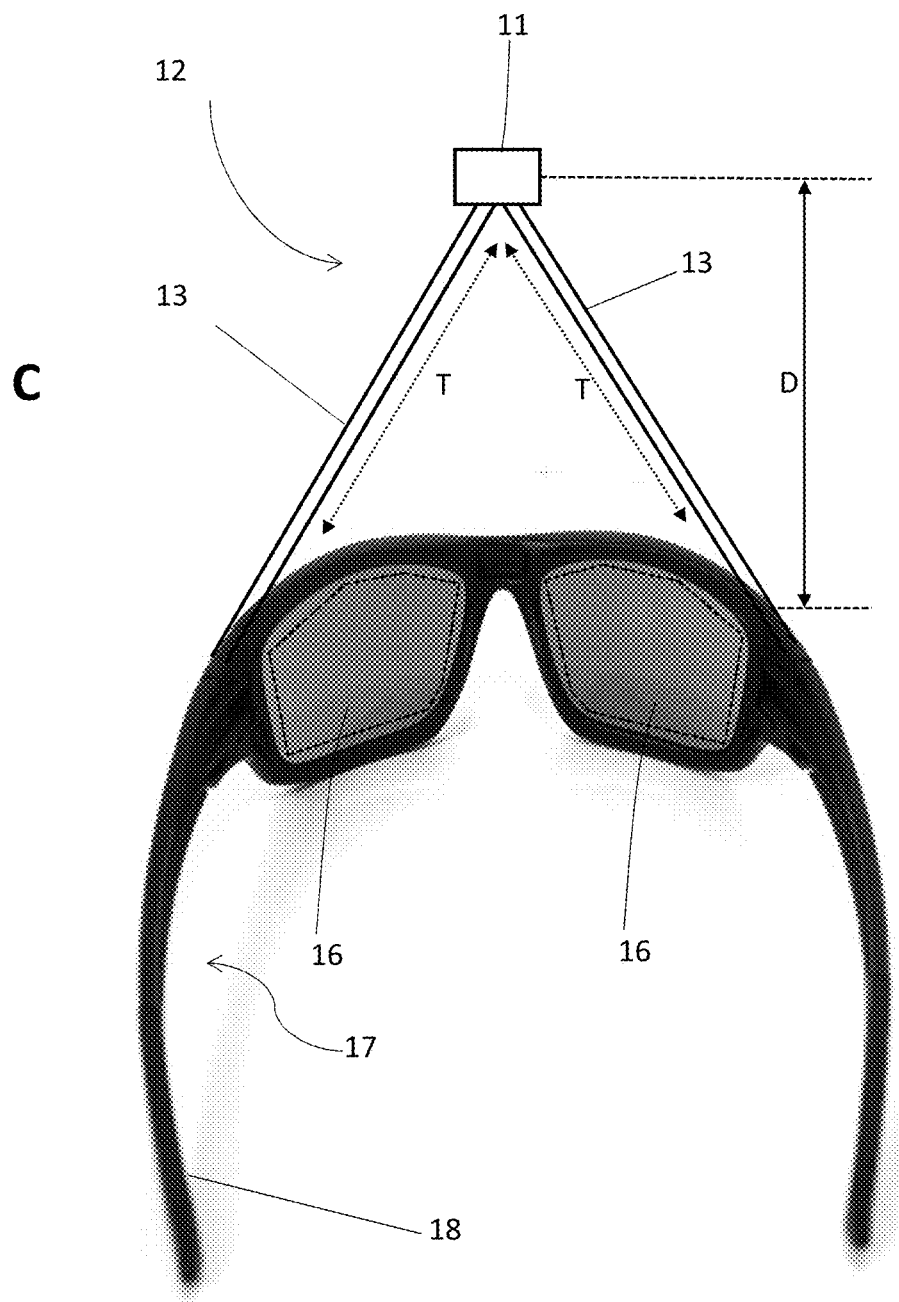
FIG. 8 depicts a rear view of another exemplary vision re-directing device embodiment.

FIGS. 6, 7, and 8 depict front and rear views of an exemplary optical device (17), including the features described herein. FIG. 7 depicts optional exemplary placement locations of an imaging extension (12) on the device. An imaging extension (12) may be placed at any one or more of the depicted locations, or other locations, on the optical device (17) with the provision that it extends forward of the device to provide for the ergonomic benefits of the device (17) as described herein. Multiple imaging extensions may be included on an exemplary device (17). Often, when multiple imaging extensions are provided, the imaging modalities (e.g., cameras) that are utilized are directed in different, but often overlapping directions. In such embodiments, the imaging hardware, firmware, or software blends the images of the multiple imaging modalities such that the user views a single blended image obtained from multiple imaging modalities. Also, in certain embodiments, each of the multiple imaging modalities provides a different image (e.g., different directions or magnifications) that can be toggled through by the user. As in other embodiments, the distance of positioning of the imaging modality on one or more of the multiple imaging extensions may be variable or static.

FIG. 8 depicts an alternative cantilevered arrangement of the imaging modality (11). In this embodiment, two supports (13) are provided to position the imaging modality (11). The supports in this embodiment may be independently extendable along axis "T," or the imaging modality (11) may be positioned along the length of either or both supports (13). Distance "D" is depicted as representative of the cantilevered positioning distance of the imaging modality 11 from the front of the frame 18. Distance D may be variable (via automated or manual positioning of imaging modality 11) for example along the directions of arrow "T," or static. Supports 13 (and optionally imaging modality 11; see embodiment of FIG. 9) are often partially or fully retractable within or relative to frame 18.

Figure 9:
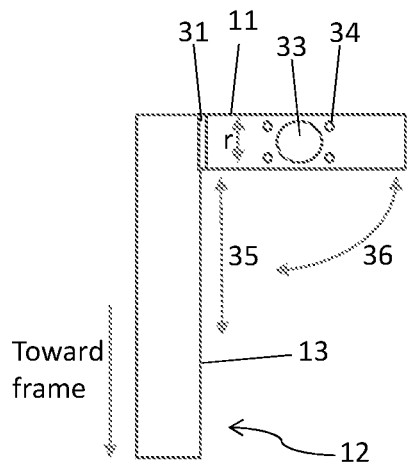
FIG. 9 depicts a bottom view of another exemplary embodiment of a portion of cantilevered imaging extension.

FIG. 9 depicts another exemplary embodiment of a portion of an imaging extension 12 contemplated herein viewed from below. An arrow is provided that indicates the direction where the support 13 would be attached to a frame of an exemplary device of the present disclosure. Support 13 includes an imaging modality 11, having a camera 33 and one or more light source 34. Though only a single light source is numbered, additional (e.g., 2, 3, 4, 5, 6, 7, 8, etc.) light sources are depicted with additional similarly appearing circles (as is the case in each instance of a similar light source depicted herein). More or fewer light sources such as LEDs may be included. The light source emits a signal that is coextensive or coaxial with the image from the camera at the work area. The imaging modality is collapsible as depicted by arrow 36, which sets forth an exemplary movement of the imaging modality. The imaging modality 11 in such embodiments may be actuated to be extended out of the recess in the support 13 in a use position as pictured, or collapsed to fold into a recess formed in the support 13 in a storage position.

Figure 10:
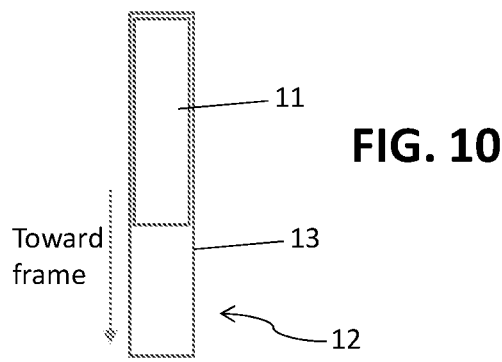
FIG. 10 depicts a side view of another exemplary embodiment of portion of a cantilevered imaging extension.

FIG. 10 depicts the imaging modality 11 in a storage position, where it is folded into a recess in support 13. Support 13 is fixed or movable (e.g., in the directions of arrow 35) relative to the wearable frame (not depicted in this Figure) of the device. The support 13 may also, therefore have use and storage positions relative to the user wearable frame. In certain embodiments, the support 13 retracts partially or fully within the user wearable frame. Positioning of the imaging modality 11 in a storage position within the support permits support 13 to fully retract within the frame, or within a telescoping unit attached to the frame. In such a manner the frame or telescoping unit can be provided with an opening that closely mates with or envelops the cross-section profile of support 13, while still permitting full retraction of the imaging modality as at least partially or completely hidden within the frame or telescoping unit attached thereto when fully retracted. While the support 13 herein is described as attached to the frame of the device, this attachment may be direct attachment or indirect attachment via, e.g., a telescoping unit attached to the frame that houses support 13. An arrow is provided that indicates the direction where the support 13 would be attached to a frame of an exemplary device of the present disclosure. Gear 31 may be utilized to rotate the imaging modality thereabout in the direction of arrow "r" located on imaging modality 11. Though arrow "r" is depicted as vertically oriented, it is intended to refer to axial rotation of the imaging modality about an axis located at or proximal to gear 31. The gear 31 may provide axial rotation of the imaging modality within a pre-determined, set, or user manipulatable angle of rotation. Movement of one or more of the various parts of the embodiment depicted in FIGS. 9-10 may be provided, or each part may be statically positioned on the device. A slipring (or similar) in, or in connection with, gear 31 may be provided to permit unrestricted rotation, while permitting electrical connection of the camera 33 and light source 34 with the display (including processor, database, data transmission, etc.) and power source of the device. Moreover, image stabilization as described herein may be provided.

Figure 11:
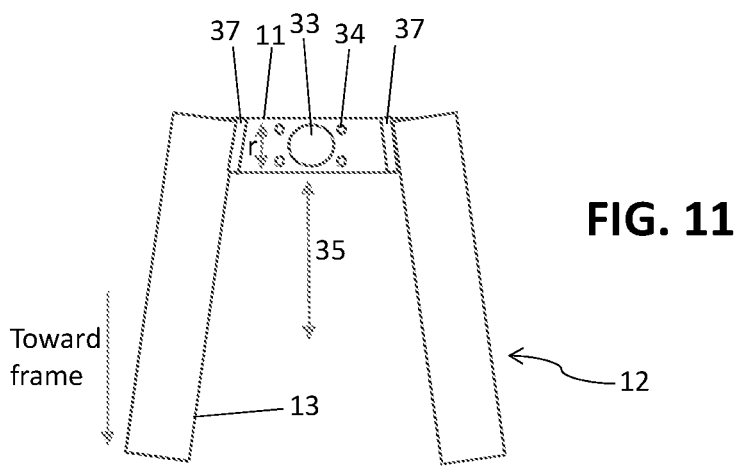
FIG. 11 depicts a bottom view of another exemplary embodiment of portion of a cantilevered imaging extension.

FIG. 11 depicts another exemplary embodiment of a portion of an imaging extension 12 contemplated herein viewed from below. In this embodiment, the imaging modality 11 is positioned between two supports 13. Attachments 37 provide for attachment and optional movement in a manner provided by gear 31 of FIG. 9. Though arrow "r" is depicted as vertically oriented, it is intended to refer to axial rotation of the imaging modality about an axis located at or proximal to one or both attachments 37. Each of attachments 37 may be the same type or different and provide for fixed or rotatable positioning of the imaging modality. For example, the attachment 37 on one side may be motorized or actuatable such that it rotates the imaging modality 11 (i.e., the drive side), whereas the other attachment 37 may be passive such as a passive bearing-based attachment. In the depicted embodiment, both supports 13 may be fixed or movable in the directions indicated by arrow 35. An arrow is provided that indicates the direction where the support 13 would be attached to a frame of an exemplary device of the present disclosure. In addition, one of the supports may be similar or identical to that depicted in FIGS. 9 and 10, including the collapsible imaging modality 11 and storage positioning of the imaging modality. Moreover, image stabilization as described herein may be provided.

Figure 12:
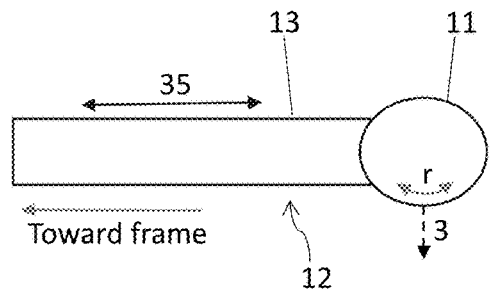
FIG. 12 depicts a side view of another exemplary embodiment of a portion of cantilevered imaging extension.

FIG. 12 is one exemplary adaptation of the embodiment of FIG. 9, for example as viewed from the side. The imaging modality 11 may be mounted to a support 13 at its lateral edges or centrally. The arrow "r" located on the imaging modality 11 depicts an exemplary rotation direction if rotation is provided. As in other embodiments, the support 13 may be fixed or movable, e.g., in the directions indicated by arrow 35. Moreover, image stabilization as described herein may be provided.

Figure 13:
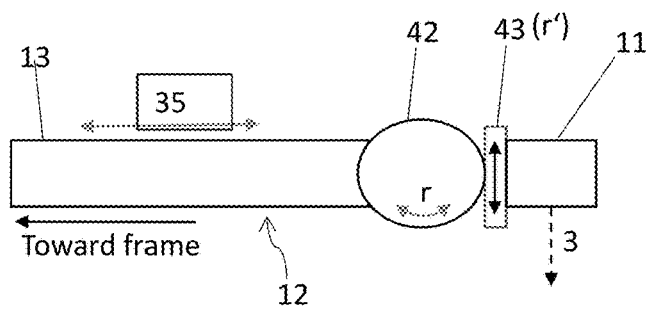
FIG. 13 depicts a side view of another exemplary embodiment of a portion of cantilevered imaging extension.

FIG. 13 depicts another exemplary embodiment of a portion of an imaging extension 12 contemplated herein viewed from the side. This embodiment includes two gears 42 and 43 that provide rotation in opposite directions (as depicted by arrows "r" on gear 42 and "r'" on gear 43) to provide for angular rotation of the imaging modality 11 in up to about 360° in either direction provided by gear 42 or gear 43. Though arrow "r'" on gear 43 is depicted as vertically oriented, it is intended to refer to axial rotation of the imaging modality perpendicular to that of arrow "r" of gear 42. In certain embodiments, only one or both gears are provided. One or both gears 42, 43 may be provided with a slipring (or similar) to permit appropriate electrical connections. Stabilization of an image (e.g., as described herein) may be provided through actuation of one or both gears to keep the camera trained on a work area or specific area or region thereof. Such stabilization or training of an image or image fee may be programmed in by the user or built into the imaging software or hardware. As such, stabilization may be automated or manually actuated. As in other embodiments, the support 13 may be fixed or movable, e.g., in the directions indicated by arrow 35. Moreover, image stabilization as described herein may be provided.

Figure 14:
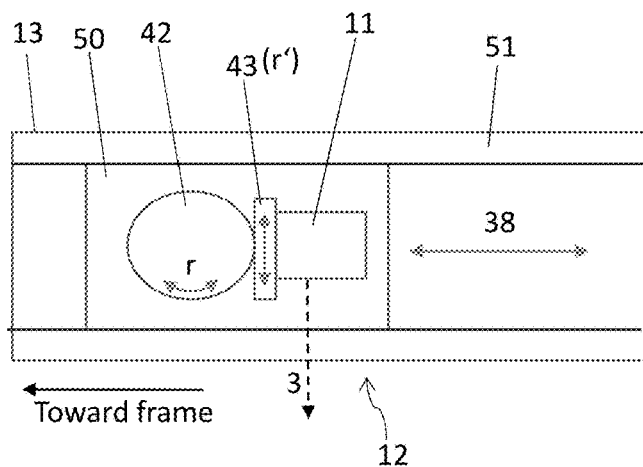
FIG. 14 depicts a side view of another exemplary embodiment of a portion of cantilevered imaging extension.

FIG. 14 depicts another exemplary embodiment of a portion of an imaging extension 12 contemplated herein viewed from the side. This embodiment includes two gears 42 and 43 that provide rotation in opposite directions (as depicted by arrows "r" on gear 42 and "r'" on gear 43) to provide for angular rotation of the imaging modality 11 in up to about 360° in either direction provided by gear 42 or gear 43. Though arrow "r'" on gear 43 is depicted as vertically oriented, it is intended to refer to axial rotation of the imaging modality perpendicular to that of arrow "r" of gear 42. FIG. 14 is similar to FIG. 13, but gears 42, 43 and imaging modality 11 is provided on cart 50 positioned on a track 51 in the support 13. Cart 50 provides for movement of the imaging modality along track 51 on at least a portion of the length of the support 13, e.g., in the directions indicated by arrow 38. Movable engagement via gear/cog or tractor tread-like engagement (not depicted; or similar moveable engagement) of the cart 50 may be provided with the support 13. Alternatively, cart 50 may be movably engaged with the support via magnetic actuation, an internally telescoping portion within support 13 and attached to cart 50, manual positioning (including fixable positioning), ratcheting, piezoelectric actuation, or other manners of movement and movable engagement known in the art. As with any embodiment provided herein that contemplates movement of the support of imaging modality movably attached to the support, manual positioning may be provided. Manual positioning may be provided such that the user can manually manipulate the location of cart 50 and/or the movably engaged imaging modality at multiple points along support 13. A switch, button, or knob (not pictured) may be actuated by the user to release the cart and permit its movement along support 13, then then released or actuated to cause the cart to be restrained in one or more different positions on support 13. Alternatively, the cart 50 or imaging modality 11 may be removed and replaced at one or more different locations along support 13. The cart 50 or imaging modality 11, in such manual operations may alternate between free movement along the support (or release from the support 13) in a mobilizable state, and attachment to the support 13 in a fixed state. The fixed state may be mechanical or magnetic attachment and provides it so that the imaging modality 11 remains in the fixed position while the device is in use. Certain embodiments permit manual manipulation and placement of the cart 50 and/or imaging modality 11, followed by or preceded by automated movement of the cart 50 and/or imaging modality 11. As in other embodiments, the support 13 may be fixed or movable. Moreover, image stabilization as described herein may be provided. While cart 50 is described herein at supporting imaging modality 11, this cart 50 is utilized as a manner of providing movable engagement of the imaging modality 11 with support 13 and is not intended to be limited to any particular iteration or manner of physical arrangement, movement, or placement.

Figure 15:
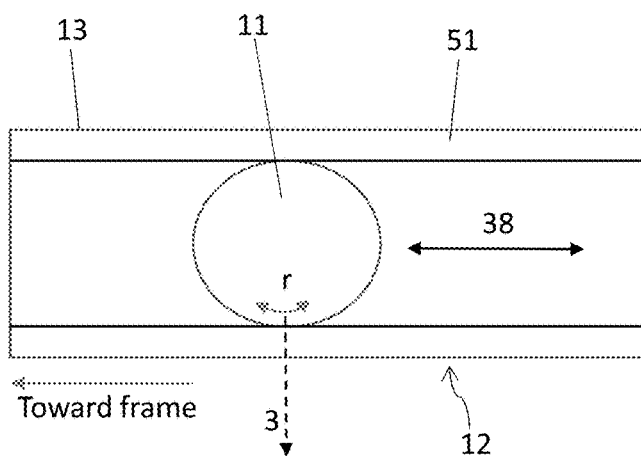
FIG. 15 depicts a side view of another exemplary embodiment of a portion of cantilevered imaging extension.

FIG. 15 depicts another exemplary embodiment of a portion of an imaging extension 12 contemplated herein viewed from the side. This embodiment is similar to that of FIG. 14, except cart 50 is not present. Rather, imaging modality 11 moves along the support using a gear (not depicted) engaged with track 51 in support 13. As in other embodiments, the support 13 may be fixed or movable. Moreover, image stabilization as described herein may be provided.

Figure 16:
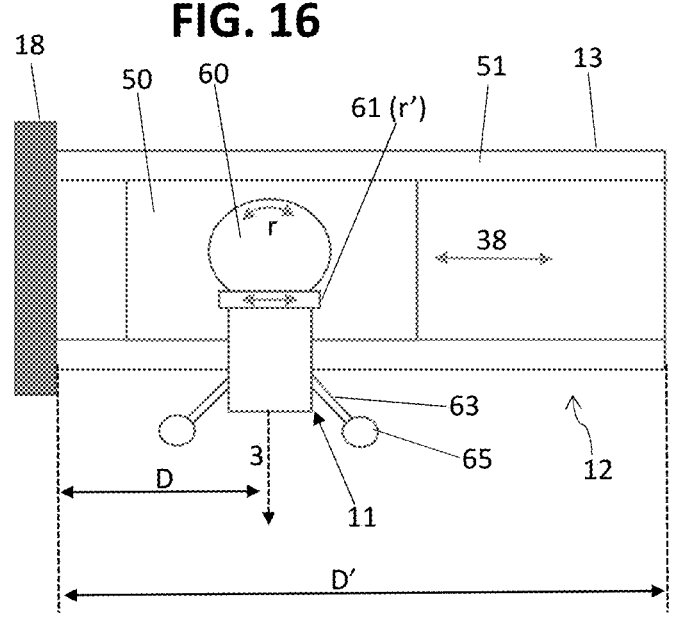
FIG. 16 depicts a side view of another exemplary embodiment of a portion of cantilevered imaging extension.

FIG. 16 depicts another exemplary embodiment of a portion of an imaging extension 12 contemplated herein viewed from the side. This embodiment includes two gears 60 and 61 that provide rotation in opposite directions (as depicted by arrows "r" on gear 60 and "r'" on gear 61) to provide for angular rotation of the imaging modality 11 in up to about 360° in either direction provided by gear 60 or gear 61. Though arrow "r'" on gear 61 is depicted as vertically oriented, it is intended to refer to axial rotation of the imaging modality perpendicular to that of arrow "r" of gear 60. Distance "D" is depicted as representative of the cantilevered positioning distance of the imaging modality 11 from the front of the frame 18. Distance "D'" is depicted as representative of the distance positioning that is available for placement of the imaging modality 11 along support 13 in from the front of the frame 18. As is indicated, imaging modality in this depiction could be moved either closer to or further away from the frame 18 using cart 50 in the directions indicated by arrow 38. Distance D or D' may be variable (via automated or manual positioning of imaging modality 11) or static. This embodiment is similar to that of FIG. 14 with an adaptation of the imaging modality to provide for automatic vertical stabilization of the camera through weighted balance rods (63). Weighted balance rods 63 (or similar) may be provided as depicted, and may or may not include additional weights 65 since the rods themselves may be weighted. Alternatively, weighted balance rods 63 are not included and the housing or other aspect of the imaging modality 11 may be weighted to provide for vertical orientation of the camera. In certain embodiments, a lens having a relatively heavy weight may be utilized at the tip or end of the camera that will provide for the plum-bob-like vertical positioning of the image modality. In this embodiment, while gears 60 and 61 may be movement actuated (automated), they may also be passive or neutral (or provided with the capability for both automated or passive movement) such that they rotate as compelled by weighted rods 63 or weighing in the housing or other aspect of the imaging modality 11 to orient the camera in a pre-determined direction such as vertically relative to the support 13. Mechanical stabilization such as this permits the user to make small positions in posture (neck, back, head, etc.) while maintaining a clear view of a work area. Automated image stabilization along with mechanical stabilization may be provided. As in other embodiments, the support 13 may be fixed or movable.

Figure 17A:
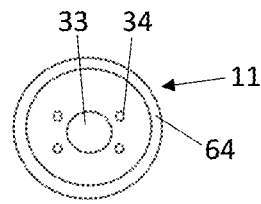
FIG. 17A depicts a bottom view of an exemplary imaging modality including a camera and light sources.
Figure 17B:
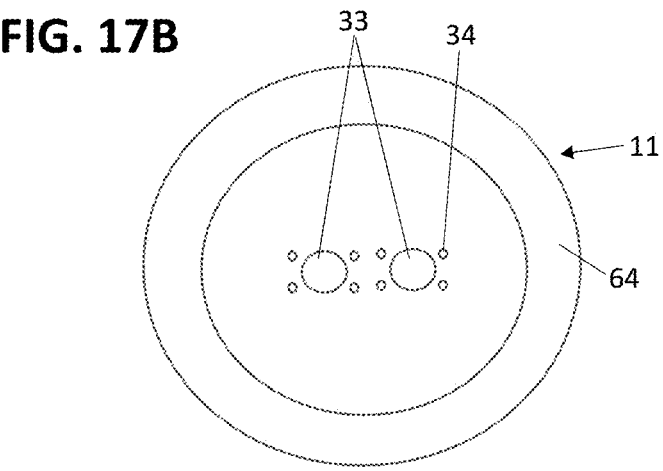
FIG. 17B depicts a bottom view of another exemplary imaging modality including multiple cameras and light sources.

FIG. 17A depicts the underside of an imaging modality 11. Housing 64 of imaging modality may be weighted or include weighted rods (not depicted). A camera 33 and light source 34 are depicted. One or more light sources 34 may be included. FIG. 17B depicts the underside of another embodiment of an imaging modality 11. Housing 64 of imaging modality may be weighted or include weighted rods (not depicted). Multiple cameras 33 and light sources 34 are depicted. One or more light sources 34 may be included. Multiple cameras 33 in such embodiments optionally provide for a binocular view of a work area to enhance the obtained image. In such an embodiment, image processing is provided such that the image of both cameras is blended into a single image. Alternatively, the image from each camera 33 is displayed in separate displays for each eye of the user.

Figure 18:
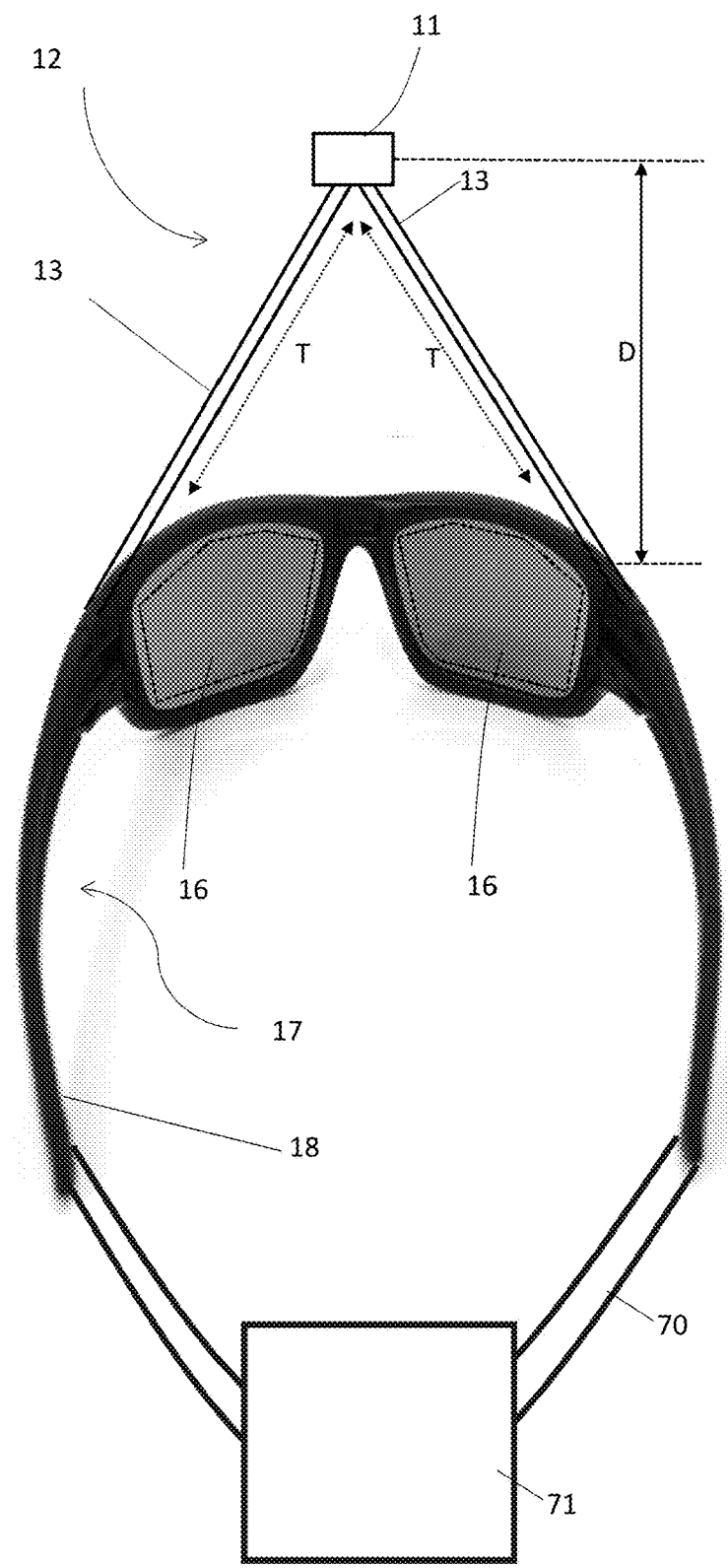
FIG. 18 depicts a top view of another exemplary device of the present disclosure, showing an exemplary power source location.

FIG. 18 depicts another exemplary embodiment of an exemplary device. FIG. 18 provides an adaptation or extension of that depicted in FIG. 8, including a wrap-around portion 70 and a power source 71. Power source 71 is utilized to power the onboard electronics for the device 200, including the camera, light source, and display. Power source 71 may include a swappable battery, including a hot swappable battery that can be replaced with or without removing the device 200 from the head of the user. Hot swapping of the power source, including a rechargeable battery or non-rechargeable battery often occurs without stopping or shutting down the system/device or certain parts of the system/device. In frequent embodiments, the device 200 is weighted such that the weight in the front F is balanced with the weight in the back B so that the device feels balanced on the head of the user without excessive forward facing pressure due to the imaging extension. Though depicted at the back of a user's head, it may be alternatively positioned to equally, or more evenly, balance the weight the device 200 from the front to the back. Positioning of the power source at the top to the back of the head of the user (or overall balancing of the various aspects as depicted) aids in balancing the various aspects of the device to avoid fatigue and pressure points, and to encourage proper ergonomic posture of the user.

The following table represents various embodiments of the device or system contemplated herein, having different limitations for the support (i.e., imaging extension, cantilever, etc.), camera rotation, light rotation, collapsible imaging modality, multiple supports, and/or multiple support engagement. With any one of these embodiments, various other aspects, features, and/or functionalities of the device as contemplated herein may be incorporated as well. For example, the support or imaging extension may be fully retractable and/or removable from attachment or integration with the frame of the optical device or system in certain frequent embodiments noted herein and below.

| Support | Tracking | Camera and/or or light rotation | Cart/ camera movement | Collapsable camera | Multiple Support engagement |
|---|---|---|---|---|---|
| Fixed | Automated | Static | Fixed | No | No |
| Fixed | Weighted | Static | Fixed | No | No |
| Fixed | None | Static | Fixed | No | No |
| Movable | Automated | Static | Fixed | No | No |
| Movable | Weighted | Static | Fixed | No | No |
| Movable | None | Static | Fixed | No | No |
| Fixed | Automated | Movable | Fixed | No | No |
| Fixed | Weighted | Movable | Fixed | No | No |
| Fixed | None | Movable | Fixed | No | No |
| Movable | Automated | Movable | Fixed | No | No |
| Movable | Weighted | Movable | Fixed | No | No |
| Movable | None | Movable | Fixed | No | No |
| Fixed | Automated | Movable | Movable | No | No |
| Fixed | Weighted | Movable | Movable | No | No |
| Fixed | None | Movable | Movable | No | No |
| Movable | Automated | Movable | Movable | No | No |
| Movable | Weighted | Movable | Movable | No | No |
| Movable | None | Movable | Movable | No | No |
| Fixed | Automated | Static | Movable | No | No |
| Fixed | Weighted | Static | Movable | No | No |
| Fixed | None | Static | Movable | No | No |
| Movable | Automated | Static | Movable | No | No |
| Movable | Weighted | Static | Movable | No | No |
| Movable | None | Static | Movable | No | No |
| Fixed | Automated | Static | Fixed | Yes | No |
| Fixed | Weighted | Static | Fixed | Yes | No |
| Fixed | None | Static | Fixed | Yes | No |
| Movable | Automated | Static | Fixed | Yes | No |
| Movable | Weighted | Static | Fixed | Yes | No |
| Movable | None | Static | Fixed | Yes | No |
| Fixed | Automated | Movable | Fixed | Yes | No |
| Fixed | Weighted | Movable | Fixed | Yes | No |
| Fixed | None | Movable | Fixed | Yes | No |
| Movable | Automated | Movable | Fixed | Yes | No |
| Movable | Weighted | Movable | Fixed | Yes | No |
| Movable | None | Movable | Fixed | Yes | No |
| Fixed | Automated | Movable | Movable | Yes | No |
| Fixed | Weighted | Movable | Movable | Yes | No |
| Fixed | None | Movable | Movable | Yes | No |
| Movable | Automated | Movable | Movable | Yes | No |
| Movable | Weighted | Movable | Movable | Yes | No |
| Movable | None | Movable | Movable | Yes | No |
| Fixed | Automated | Static | Movable | Yes | No |
| Fixed | Weighted | Static | Movable | Yes | No |
| Fixed | None | Static | Movable | Yes | No |
| Movable | Automated | Static | Movable | Yes | No |
| Movable | Weighted | Static | Movable | Yes | No |
| Movable | None | Static | Movable | Yes | No |
| Fixed | Automated | Static | Fixed | Yes | Yes |
| Fixed | Weighted | Static | Fixed | Yes | Yes |
| Fixed | None | Static | Fixed | Yes | Yes |
| Movable | Automated | Static | Fixed | Yes | Yes |
| Movable | Weighted | Static | Fixed | Yes | Yes |
| Movable | None | Static | Fixed | Yes | Yes |
| Fixed | Automated | Movable | Fixed | Yes | Yes |
| Fixed | Weighted | Movable | Fixed | Yes | Yes |
| Fixed | None | Movable | Fixed | Yes | Yes |
| Movable | Automated | Movable | Fixed | Yes | Yes |
| Movable | Weighted | Movable | Fixed | Yes | Yes |
| Movable | None | Movable | Fixed | Yes | Yes |
| Fixed | Automated | Movable | Movable | Yes | Yes |
| Fixed | Weighted | Movable | Movable | Yes | Yes |
| Fixed | None | Movable | Movable | Yes | Yes |
| Movable | Automated | Movable | Movable | Yes | Yes |
| Movable | Weighted | Movable | Movable | Yes | Yes |
| Movable | None | Movable | Movable | Yes | Yes |
| Fixed | Automated | Static | Movable | Yes | Yes |
| Fixed | Weighted | Static | Movable | Yes | Yes |
| Fixed | None | Static | Movable | Yes | Yes |
| Movable | Automated | Static | Movable | Yes | Yes |
| Movable | Weighted | Static | Movable | Yes | Yes |
| Movable | None | Static | Movable | Yes | Yes |
| Fixed | Automated | Static | Fixed | No | Yes |
| Fixed | Weighted | Static | Fixed | No | Yes |
| Fixed | None | Static | Fixed | No | Yes |
| Movable | Automated | Static | Fixed | No | Yes |
| Movable | Weighted | Static | Fixed | No | Yes |
| Movable | None | Static | Fixed | No | Yes |
| Fixed | Automated | Movable | Fixed | No | Yes |
| Fixed | Weighted | Movable | Fixed | No | Yes |
| Fixed | None | Movable | Fixed | No | Yes |
| Movable | Automated | Movable | Fixed | No | Yes |
| Movable | Weighted | Movable | Fixed | No | Yes |
| Movable | None | Movable | Fixed | No | Yes |
| Fixed | Automated | Movable | Movable | No | Yes |
| Fixed | Weighted | Movable | Movable | No | Yes |
| Fixed | None | Movable | Movable | No | Yes |
| Movable | Automated | Movable | Movable | No | Yes |
| Movable | Weighted | Movable | Movable | No | Yes |
| Movable | None | Movable | Movable | No | Yes |
| Fixed | Automated | Static | Movable | No | Yes |
| Fixed | Weighted | Static | Movable | No | Yes |
| Fixed | None | Static | Movable | No | Yes |
| Movable | Automated | Static | Movable | No | Yes |
| Movable | Weighted | Static | Movable | No | Yes |
| Movable | None | Static | Movable | No | Yes |

In certain embodiments the image provided by the imaging modality may need to be rotated or flipped if desired, for example, to match the view orientation of the work area that would be obtained through naked eyesight. For example, the optics in the camera may flip an image 180°, thus providing the opportunity to rotate that image optically or electronically so that it appears "upright" in the display viewed by the user.

While a generally linear and horizontal orientation of any particular support 13 is provided herein, that is for ease of reference and depiction only and therefore, unless specifically indicated, non-limiting. A variety of other physical orientations of the support may be provided, for example support 30 may be curved or sloping, angular, otherwise non-linear, and/or may attach to the device or system at any portion, in front on top, at the side, or in the back of the head of the user, including embodiments (such as an undersloping embodiment) where the imaging modality is positioned vertically lower versus the eyes of the user when the user is seated upright in an ergonomically correct position. Supports 13 contemplated herein, however, are limited in that they are attached (direct or indirect) to a device worn by a user, and provide for the horizontal plane positioning or orientation of an imaging modality at a distance "D" or within a distance "D'" from (e.g., in front of) a user or the attached device worn thereby.

Although support 13 is often depicted herein as fixedly attached to the frame of the wearable devices contemplated herein, it is not intended to be limited to such attachments. In particular, the support may be vertically and/or horizontally adjustable (without regard to distance "D") while attached to the frame. Moreover, in frequent embodiments provided herein the support may be removable from the frame and replaced with a different support or attached to a different frame. As such, a support alone, or an imaging extension including the support and imaging modality, contemplated herein may be removable and attached to a head gear frame worn by a user such that the user may utilize a single head-worn frame with multiple removable imaging extensions. This is contemplated, for example, when different functionalities are desired from the different attached or attachable imaging extensions. Moreover, this permits the user to have a customized fit for the head wearable frame or a personalized frame that can be transported anywhere and utilized with borrowed, loaner, or replacement imaging extension equipment and/or imaging modalities. Imaging modality servicing and upgrades are simplified without removing the device from use when such functionality is provided. Moreover, permitting the removal of the imaging extension provides for ease of cleaning of either the frame or the imaging extension, which is especially important when used in a medical setting such as a dental office or surgical suite. The frame, for instance, can include shielding such that it bears the major exposure to possible biologic contamination and would benefit more from more rigorous sanitary and sterilization measures. This permits more rigorous cleaning of the device and such shielding without exposing the camera optics to such cleaning measures. Moreover, as there are a wide variety of head shapes and sizes, permitting customized fitting of the frame and replacement of imaging extensions will provide for a single fitting and a prolonged lifetime of custom-fitted use of that frame, together with the latest advances in display and/or imaging modality technology that can be attached to and removed from the frame.

The present devices provide a view of a work area not possible with existing wearable devices. This permits control of the view provided to the user in a real-time, unrestricted and uninterrupted manner not previously possible. Moreover, the present devices address the massive and longstanding ergonomic problem in a manner that does not create more or additional ergonomic issues, and also provide comfortable and adjustable viewing experience and quality not previously possible.

In general, devices of the present disclosure are provided or implemented in a manner that is compliant with all Federal Regulatory laws and rules as medical devices (e.g., HIPPA compliant, FDA compliant, Health Ministry compliant, etc.). For example, the present devices are implemented to ensure safe use for the user and patient or subject, including protection of the health (e.g., eyes, skin, mucosa, etc.) of the patient.

In certain frequent embodiments, a device described herein includes one or more of a variety of imaging modality options. In certain embodiments, a camera (often an HD camera, camera capable of capturing digital images, or other imaging device—together referred to herein as a "camera") is the imaging modality option and is focused through the line of sight. This camera, for example, is capable of taking still images or video capture. Generally, cameras contemplated herein provide for electronic image capture and are often operably linked with firmware and/or software with an application that permits electronic magnification of captured images. Such cameras are also often operably linked with a database or storage medium that permits storage of selected images, series of images and/or videos captured with the camera. The term "image" or "images" as it refers to information captured by cameras described and contemplated herein is, unless specifically indicated otherwise, intended to include still-capture and video-capture.

Cameras contemplated for use in the devices described herein are compact or miniature, such as the size of an HD camera resident on a mobile device such as a smart phone, tablet, or laptop. Often, the camera is capable of capturing 8 MP, 12 MP, 16 MP, 16.3 MP, or more detailed pictures. Also often, the camera is capable of capturing 720i, 720p, 1080i, 1080p, or 4K video captures. In certain embodiments, the camera is capable of capturing up to about 20 MP, 30 MP, 40 MP, or 50 MP images. In certain frequent embodiments, the camera is a 180° camera, capable of viewing up to 180° and zooming in within discreet areas of the viewing area. In certain other embodiments, the camera is a 360° camera, capable of viewing up to 360° and zooming in within discreet areas of the viewing area. Often, in such embodiments, the user can select a portion or region of the 90°-180°, or 180°-360°, view to focus on or to magnify, often via digital magnification. Occasionally, in such embodiments the display may be provided in a manner that does not permit the user to view through the display, though see through displays may be frequently employed.

The operation of the camera in such embodiments often involves line of sight angulation and magnification as described herein. Alternatively, the camera can be provided in an angle that does not require line of sight angulation, but permits the user to assume an ergonomically correct or appropriate posture when viewing a work area. According to the present disclosure, the camera is often adapted to have a pre-determined or adjustable focal length. Also, the camera is often adapted to provide a magnification capability (as discussed elsewhere herein) such that images viewed through the camera are at least as magnified as if they were viewed through the devices described herein. Enhanced magnification is also often employed, to provide magnification levels beyond that which are typically utilized in an optical loupe. In certain frequent embodiments, detailed images are provided using digital imaging at the same magnification and quality as an intraoral camera or an extra oral camera.

The focal length is provided or adjustable in a manner that permits or requires the user to assume a predetermined vertical and horizontal distance from a known work area, and which predetermined vertical and horizontal distance from the known work area correlates with an ergonomically correct or appropriate posture for the user. This correlation, for example, refers to if the device is worn on the head of the user, proper viewing of the work are is only provided if the user assumes a predetermined ergonomic position.

In certain embodiments, the imaging modality option is provided with an adjustable focal length such that the camera can provided focused images of a work area if the focal length varies within a pre-defined distance. Such embodiments provide an important utility such that a desired focal length need not be built into the device, but rather is provided in an adjustable manner. In related embodiments, the angulation of the camera or vision through the camera, and/or the corresponding focal length, is/are adjustable to permit the user to assume multiple different (and desirably ergonomically correct) positions relative to a work area. This adjustment may be automatic or manual. Manual adjustment is often accomplished through manual adjustment of a direction of a camera or optical device such as a prism or mirror.

Automatic adjustment may be accomplished through, for example, the use of a tracking algorithm, software, or firmware that centers the line of sight regardless of the movement of the device or user wearing the device. Fiducials identifiable by the device or its operating code may be utilized to identify a portion, or boundaries, of a work area in the case of automated tracking to delineate a specific area for the camera to focus. In certain embodiments, the camera or tracking algorithm, software, or firmware controlling the camera is adapted with facial recognition capability such that the camera can recognize the location of a work area such as a mouth or other operation site of a subject. In the case of a medical procedure, anatomic reference points may be utilized to establish a specific area for the camera to focus, for example via automated tracking. Visual cues specific to the work area (e.g., page boundaries, surgical tools or equipment, dyes, colors, natural or synthetic patterns, bar codes, facial features, etc.), depending on the task or purpose for viewing the work area, will often be utilized to establish a specific area for the camera to focus, for example via automated tracking. In practice, though it may remain active, alternatively automated tracking may be utilized to permit the user to assume an ergonomically correct position to establish an optimal line of sight, and thereafter automated tracking may be turned off to lock the line of sight for the device in an optimal ergonomically correct position. Automated tracking may be activated or turned off by any of a variety known mechanical or electronic adaptations controllable by a user. Tracking such as automated tracking may also be provided in a timed manner such that once activated, it will automatically end upon the expiration of a predetermined time period to lock the line of sight after automated tracking ends.

The camera is often provided with auto-focus capability. Preferably, the auto focus capability permits fine focusing within small distances along the focal length to provide sharp images. For example, the camera is capable of auto focusing at any point along an exemplary focal length of between about 18 inches to about 48 inches. In certain embodiments, the focal length is between about 12 inches to about 60 inches. Most embodiments employ a localized focal length, but in certain embodiments (often in the media, entertainment, military, and hobbyist arenas) long range or telescopic focal lengths may often be desired. Often, such auto focus is fine auto focusing. Auto focus capabilities may be provided, for example, through known methodologies, such as those provided with MEMS capabilities in U.S. Patent App. Pub. Nos. 20140184890, 20140184881, and 20140184899.

In certain embodiments automated tracking is not utilized and the angulation and/or focal length is manually adjusted by the user. Magnification strength is often also provided in a manner that is adjustable by the user through any of a variety of mechanisms, including foot or hand operated mechanisms. In certain embodiments, control over one or more functions of the camera such as magnification strength, focal length, angulation, etc., is/are controlled using a handheld device such as a dentist mirror or probe held by the user. In certain frequent embodiments, such controls are provided through voice commands or prompts.

In certain embodiments, when voice-control is provided over any or all functionality of the devices described herein, a microphone or voice/sound-recognition modality is included to ensure the device responds to appropriate prompts. For example, a microphone in certain embodiments is attached to the device and positioned, or movable to, within close proximity of the mouth of the user. In certain embodiments, the microphone is built into the housing of the device. Also in certain embodiments, the microphone is connected with the device controls or operating system via wireless connection (e.g., WPAN/Bluetooth, Coexistence, High Rate WPAN, Low Rate WPAN, mesh Networking, Body Area Networks, WiFi, WiMax, other wireless networks, Visible Light Communication, etc.).

As noted, the present device is operable with the same or similar functionality as an intraoral camera. Optical and/or digital zoom technologies coupled with dental office data connectivity often provide such functionality. While the present device is not intended to be inserted within the mouth of a subject, similar or equivalent images to an intraoral camera, which are well-known in the dental arts, are capable of being obtained. For example, in certain embodiments indirect images are captured of a work area. The present device provides magnification levels equivalent with that of present intraoral cameras. Indirect images may be obtained, for example, by imaging a work area reflected from a mirror such as a surgical, dental, or dentist's mirror. In such embodiments, an image of the work area is captured by focusing the camera on the mirror that is reflecting an image of the work area. As also noted, the present device is operable with the same or similar functionality as an extra oral camera. Optical and/or digital zoom technologies coupled with dental office data connectivity often provide such functionality. In most embodiments, the device can be equipped with on-board or connected touchpad or on-board swipe-pad control.

The camera is generally provided in data connectivity with imaging software. For example, in certain embodiments the camera is integrated with an imaging software systems similar to, or such as, DEXIS, Eaglesoft, XDR, Apteryx, MiPACS, Tiger View, MacPractice, Carestream, ProfSuni, VixWin, Kodak, Romexis, and/or Schick. In other embodiments, the camera is integrated with another imaging software program. Imaging for general dentistry, orthodontics, Caries detection, cosmetic work, oral and maxillofacial surgery, among other purposes is contemplated. Imaging software is often utilized to aid diagnosis, obtain procedure approval, educate patients, educate students, design treatment protocols, guide treatment, validate protocols, develop new modalities, etc. In general, a computer system necessary to process image information comprises is included comprising, for example, a CPU, Network Interface, display device, high speed display device I/F board, Input device I/F, GPU, Media Reader, Memory, Component, Hard drive I/F and Hard Drive, High performance cooling unit, Wireless or Network I/F, Bundled Software, and operating system.

In certain embodiments, image processing and display can be done on a work station or tablet processor (with 2D or 3D capability) with appropriate specifications. Exemplary specifications often include a High Resolution (Touch) Screen with Naked Eye or glasses enhanced 3D, Dual Core Cortex, Wi-Fi, Android or iOS OS, 1 GB RAM or greater, and at least 8 GB Internal Memory. With 3D engine chips, 3D image intertwined decoding and a switchable parallax barrier LCD screen can be provided to achieve the 3D stereoscopic video without glasses, supporting the exemplary video formats, 2D Video: MPEG 1/2/4, H.264, MJPEG, VC1, WMV, Real Video format video, 1080P resolution, 4K resolution, Photo formats can be supported with, for example: BMP, JPG, JPEG and other known formats; 3D Images can be supported with, for example: MPO-3D image format.

In certain embodiments, the software environment bundle often includes an operating system (OS), 2D or 3D custom proprietary display drivers, 2D or 3D camera, 2D or 3D multiplexed video player, 2D or 3D processor graphical user interface (GUI) menu driven control system, (dual) Universal Serial Bus (USB-2.0-3.0) input line 2D or 3D, single USB input stereo pair (USB 2.0-3.0) line 2D or 3D, Direct or Open GL CAD visualization line 2D or 3D, web conferencing 2D or 3D, CAD visualization 2D or 3D, 3D CAD file format converter, 2D or 3D stereoscopic raw uncompressed alternating, 2D or 3D stereoscopic raw uncompressed over and under switchable format, 2D or 3D stereoscopic raw uncompressed side-by-side switchable format, bundled software executable's are often preinstalled, and 2D or 3D dual camera multiplexed wire or wireless channel.

As indicated, in the most frequent embodiments, the device is worn by a user as would be a pair of spectacles. Alternatively, the display is provided in a visor portion. The display is presented in front of the eyes of the user as would be the lenses of such spectacles. The image displayed, for example, inside or adjacent to the lens or frame of the spectacles. Stereo displays and a mono displays are contemplated. Displays contemplated herein are therefore near-view displays. Near-view displays contemplated herein provide, for example, equivalent visual acuity in images displayed close to the eyes as they would be if viewed from a slight distance. An exemplary display technologies are provided, for example, in PCT Publication Nos. 2015095737, 2015048911; U.S. Patent App. Pub. Nos. 20150022542, 20140132484, 20130235331, 2013044042, US20120235887, US20120119978, the contents of each of which are incorporated by reference. Further examples of screen types are provided elsewhere herein. In other embodiments, a screen such as an LCD screen, plasma, prism-reflective, or projector screen may be provided adjacent to, as part of, or forming, the display. The wearable device is provided with a display for images captured by an on-board camera. This display is, in the most frequent embodiments, a see-through display such that the user can see through the display when it is not actuated or prompted to display images captured by the on-board camera or images fed from another source. When the display is prompted to display images from the camera the user views the images instead of, or in addition to, being able to see through the display. Often images are provided on a viewing area of the display.

In certain frequent embodiments images are displayed or projected on a display that is changeable from clear to opaque. Smart glass technologies such as electrochromic smart glass, photochromic smart glass, suspended particle smart glass, liquid crystal smart glass (e.g., polymer dispersed liquid crystal), nano smart glass, etc., device technologies are contemplated. The smart glass technologies are embedded in a portion of the display or provided in a film applied to the display. Electrochromic device technology, for example, typically comprises a multilayer stack including an electrochromic material, an ion conductor to permit ions to move in and out of the electrochromic material to cause the optical property change, and transparent conductor layers (e.g., transparent conducting oxides), over which an electrical potential is applied. Generally, when applied to the display, smart glass films are applied with optically clear adhesive available, for example, from Minnesota Mining & Mfg., Saint Paul, MN. For smart glass technologies requiring an electric charge or signal to switch from clear to opaque, or vice versa, power to impart the electric signal (e.g., electric potential or charge) is provided from a battery on the device or another on-board or remote power source. In the most frequent embodiments, a smart glass technology is utilized that requires a signal (e.g., electric signal, magnetic signal/force, etc.) to switch from opaque to clear, and vice versa; but not to maintain the state of clear or opaque once either state has been achieved.

In such embodiments, the screen is frequently positioned in the line of sight of the user as would the lenses of a pair of spectacles. When the camera or imaging modality is not being utilized, the user can view directly through the screen as if it was a clear spectacle lens. The screen in such embodiments is queued in a manual or automated manner to transition from transparent to opaque, and vice-versa, such that in the opaque mode, a limited amount of light is permitted through the screen.

In the opaque mode often 50% or less (e.g., less than 30%, less than 20%, less than 10%, less than 5%, or 0%) of light rays are permitted to pass though the screen to the eyes of the user. In certain frequent embodiments, when "opaque" the display is shaded in coloration, for example as in a shade coloration in a pair of sunglasses. In such embodiments, the device is often adapted to wrap around the eyes of the user to provide light shielding from the sides, top, and bottom, in addition to within the line of sight to provide a dark environment for the user to view images projected or displayed on the screen. Shields or light barriers may be utilized to wrap around the areas peripheral to the line of sight of the user such as the top, sides, and/or bottom areas relative to the line of sight. Such shields or light barriers may be discreet portions of the device, part of the device housing or frame, or otherwise build into the device. Such embodiments permit the user to be able to switch between modes of using manual sight and digital imaging. The side, bottom, and/or top shields or light barriers may be provided with the same or similar material to the screen such that they all transition together or separately between transparent or opaque; or one or more of the side, top, and bottom shields or barriers are provided with opaque material that prohibits light entry. In operation, when the screen is transparent, the user can view a work area directly; and when the screen is opaque an image of the work area provided by an digital imaging option (e.g., a camera) is displayed or projected on the screen internal to the user's eyes such that the user can view the image on the screen in real-time, time-delayed, or fast-forward manner.

In certain embodiments, the display is movable into and out of the line of sight of the user. In such embodiments, when the display is outside of the line of sight of the user, the user can view the work area directly. And, when the display is positioned in the line of sight of the user, images from the camera are displayed or projected on the display. In such embodiments the display may be opaque or transition between transparent and opaque.

In certain embodiments, a shade is provided movably connected with the device. Such a shade is movable between a position that permits outside light to pass through to the eyes of the user, and a position that blocks all or a portion of the outside light from the user's eyes. For example, the shade may cover the outside portion of the display (110) in one position and not cover the outside portion of the display (110) in a second position. Exemplary shades may also cover peripheral portions of the device around the eyes of the user to limit the entrance of outside to the user's eyes. Limiting outside light from contacting the user's eyes is often advantageous when the display is operating to enhance visual acuity of images displayed or projected on the display.

In certain embodiments, the display is not a see-through display, but direct vision of the user is nonetheless provided while wearing the device containing the display. Often, in such embodiments, an optionally separate or additional camera is provided in a face-forward orientation (e.g., a face-forward camera). The face-forward camera can, in certain embodiments, include a wide-angle or wide-aperture lens, or another lens, to mimic normal sight of the user. In operation, then the user would like to switch from viewing the work area to direct vision, the device is actuated to switch from displaying images from the work area viewing camera to displaying images from the face-forward camera.

Most frequently, a camera (preferably a high-definition camera) is focused through a work area optical path. This camera, for example, is capable of taking still images or video capture. The operation of the camera in such embodiments often involves line of sight angulation and magnification as described herein. Alternatively, the camera can be a wide angle camera such as a 180 degree or 360 degree camera positioned at distance D on a support and provided in an angle that does not require line of sight angulation, but permits the user to assume an ergonomically correct or appropriate posture when viewing a work area. In such embodiments, the camera is often adapted to have a predetermined focal length, which is often adjustable. Also, in such embodiments, the camera is often adapted to provide a magnification capability such that images viewed through the camera are magnified in a manner desired by the user and in the magnification ranges contemplated herein. Often, in such embodiments, the focal length is provided in a manner that requires the user to assume a predetermined vertical and horizontal distance from a known work area, and which predetermined vertical and horizontal distance from the known work area correlates with an ergonomically correct or appropriate posture for the user. This correlation, for example, refers to if the device is worn on the head of the user, proper viewing of the work area is only provided if the user assumes a predetermined ergonomic position.

In digital imaging embodiments, the apparatus may be provided with a viewing area (display) for images captured by the camera. Often the viewing area (display) is a screen displaying or projecting images captured by the camera. Often, the screen is worn by the user as would be a pair of spectacles, with the image displayed inside or adjacent to the lens or frame of the spectacles. Though it is acknowledged that the device may not appear like a traditional pair of spectacles, and may engage with the head of the user in any number of manners to permit comfortable wearing while the user assumes an ergonomically correct position. In certain embodiments, the display is present in a visor portion. Frequently, a screen such as an LCD screen, plasma, or projector screen is provided adjacent to, as part of, or forming, a front shield. For example, the image may be displayed on at least a portion of the front shield of the device. A variety of types of displays are contemplated, for example, those described in U.S. Patent App. Pub. Nos. 20130235331, 20080169998, 20100110368, 2013044042; and U.S. Pat. Nos. 6,023,372 and 8,744,113, though including adaptations described for such displays described herein.

In certain embodiments, the imaging modality provides functionality for the user to view or detect photoactivated or chemically activated substances in real-time such as a radiolabel, a fluorophore or fluorescent dye, biotin, an enzyme, a chemiluminescent compound, or another type of detectable signal. This can be used, for example, to help detect carious lesions on the tooth structure to make sure the tooth has been adequately debrided. The imaging modality option also provides, in certain embodiments, infrared imaging capability. In certain embodiments, the imaging modality incorporates a fluorometer or luminometer. In such embodiments, the el imaging modality may be provided in a manner that it can distinguish emission light within certain wavelengths, for example emissions provided by the following exemplary fluorescent dyes: rhodamine dyes tetramethyl-6-rhodamine, and tetrapropano-6-carboxyrhodamine, and the fluorescein dyes 6-carboxyfluorescein and, each in combination with a DABCYL quencher. Other suitable dyes include, for example, 5'-hexachlorofluorescein phosphoramidite, and 2',7'-dimethoxy-4',5'-dichloro-6-carboxyfluorescein, BIOSEARCH BLUE® (BG5-5088), CAL FLUOR® Gold 540, CAL FLUOR® Orange 560, CAL FLUOR® Red 590, CAL FLUOR® Red 610, CAL FLUOR® Red 635, PULSAR® 650, Quasar 670, Quasar 705, among others. Often, in such embodiments, the device incorporates a proper excitation signal source such as an LED that emits a light signal within the excitation spectrum of the photoactivated substance, in addition to appropriate filters and optics. Such embodiments may employ a camera such as a CMOS camera (e.g., IDS UI-5490HE) or a CCD camera (e.g., Lumenera LW11059 or the Allied GE4900) to detect emission signals.

In certain embodiments, the presently described device captures and analyzes an image in a work area in addition to and an image of one or both eyes of a user as a manner of controlling a movement of the imaging modality, its positioning on the cantilever, or a view of the image captured by the camera. In such embodiments, movement and/or positioning of the eye or eyelid are captured or sensed through the use of a camera or sensor to control or adapt the image viewed by the user of the device. In certain related embodiments, the presently described device is capable of executing a specific function corresponding to a gesture of an eye, or eyes, of the user based on the result of the analysis. Imaging or sensing of one or both eyes (and/or eye lids) of the user often provides certain functionality to the present devices for controlling functions of the device camera (e.g., camera direction, imaging modality, or focus), display (e.g., viewing images from a camera or another source, operation of smart glass functionality, etc.), or other data-connected connected functions contemplated herein. Eye or lid control functionality of the device may be turned on or off.

For example, an eye or lid movement or position in a predetermined direction may actuate a servo, motor, or piezo that controls the positioning of the camera on the device. Positioning may be horizontal, vertical, angular, and/or rotational positioning. Also for example, an eye or lid movement or position in a predetermined direction may actuate a focus or magnification operation of the camera on the device or in the display. Also for example, an eye or lid movement or position in a predetermined direction may actuate the horizontal position of the camera on a cantilever or positioning of a cantilever. Also for example, an eye or lid movement or position in a predetermined direction may actuate the operation of smart glass embedded on the device to initiate it to become more or less opaque. Also for example, an eye or lid movement or position in a predetermined direction may capture an image or video of the work area or transmit such images or data between the device and an external database, storage, imaging software, or lab information system. Also for example, an eye or lid movement or position in a predetermined direction may actuate voice control operations for the device or control power operations such as turning off or setting in a standby mode to permit swapping of battery pack. Also for example, an eye or lid movement or position in a predetermined direction may actuate an external device (e.g., a dental handpiece, sensor, milling equipment, medical equipment, office operations, computer, camera, mobile device, etc.) held by, controlled by, or within view of, the user of the wearable device or another person.

In frequent embodiments, the present system is compatible with implant imaging software. Generally, such compatibility involves integration such that real-time images during implantation are provided on the display to the user. Implant imaging systems that provide implant imaging such as visualization of the work area and any dental tools utilized to perform implantation, including angulation, location, and movements thereof are similarly provided on the display. Often, such imaging is derived from a device other than the camera on-board the device (e.g., external sensors or imaging modality) and images are fed to the display through an external input and provided via corded or wireless data (e.g., WPAN/Bluetooth, Coexistence, High Rate WPAN, Low Rate WPAN, mesh Networking, Body Area Networks, WiFi, WiMax, other wireless networks, Visible Light Communication, etc.) transmission.

The display also often accepts inputs that are useful for operating or managing a busy practice. For example, external messaging may be provided on the display for viewing by the user while the user is wearing the device. Such external messaging is often in the form of internal office messaging to enhance real-time communication within the office. For example, the front staff can communicate with the user information about patients in the office or expected patients in the office, information about timing and workflow, information about insurance and procedure approvals, or to provide messages to be relayed to others in the office including patients. A variety of other messaging options and capabilities are contemplated herein to provide real-time messaging to the user, for example during a procedure, such that verbal or audible distractions are obviated, for example, to preserve confidentiality. Such messaging functionality is also often provided in systems and devices utilized by non-medical arena users, such as users in the telecommunications or media areas, hobbyists, or lay people.

Remotely positioned imaging modalities and data sources in optical communication with the display are contemplated. The types and locations of the remotely positioned imaging modalities is non-limiting.

Using display functionality described herein, the user can obtain images of a procedure or of specific aspects of a work area that are useful or necessary to obtain approval for a medical procedure from an insurer or other approval source. The user is able to, for example, select specific images or videos and upload them to a billing or procedure approval system. As such, the presently described devices increase workflow to e-claims for insurance coverage. The device capabilities often provide a conjunctive aid in diagnosis. Such functionality aids workflow in an office and results in less time for procedures and the ability to see additional patients in a work day.

Other features and advantages of the disclosure will be apparent from the following detailed description, and from the claims. The present disclosure is provided using a variety of examples provided herein. The examples are provided solely to illustrate by reference to specific embodiments. These exemplifications, while illustrating certain specific aspects of the disclosure, do not portray the limitations or circumscribe the scope of the disclosure. Citation of the above publications or documents is not intended as an admission that any of the foregoing is pertinent prior art, nor does it constitute any admission as to the contents or date of these publications or documents.

We claim:

1. A wearable optical system, comprising:
a user wearable frame adapted to be worn on the head of a user;
a support attached to the user wearable frame;
a display attached to the user wearable frame by the support that is viewable by a user via a horizontal optical path extending away from the user; and
an imaging modality attached to the user wearable frame by the support defining a work area optical path in optical communication with the display and positioned on the support at a distance "D" in front of the user or intended user, the distance "D" being measured, from where the front of the forehead of the user would be when the system is donned to a distance measured horizontally between about 2 inches and 20 inches in front of the user;
wherein the work area optical path is provided within a plane at a working area angle of between 46° and 120° vertically downward and away from the horizontal optical path, wherein the work area optical path is adjustable within a predetermined range of angles, wherein the predetermined range is an angular adjustment of up to 360 degrees perpendicular to the plane of the working area angle, and wherein the work area optical path defines a path between the imaging modality and a work area, the path being between 12 to 60 inches in distance, and
wherein an image captured by the imaging modality is provided for viewing on the display.

2. The wearable optical system of claim 1, wherein the imaging modality is comprised in a cart rotatably adjustable positioned on the support.

3. The wearable optical system of claim 2, wherein the cart is configured for manual or automated adjustment between one or more different positions on the support.

4. The wearable optical system of claim 1, wherein the image modality comprises a camera and the camera is configured to rotate vertically within a plane below the horizontal optical path and/or is configured to rotate laterally relative to the plane.

5. The wearable optical system of claim 1, wherein the imaging modality is weighted to orient the imaging modality in a predetermined vertical angle relative to the horizontal optical path.

6. The wearable optical system of claim 1, wherein one or more functions of the system are controlled by the movement of an eye, an eyelid, or a part of an eye of the user.

7. The wearable optical system of claim 6, wherein the one or more functions comprises altering an optical or a digital focus of the imaging modality or display, movement of a focus of the imaging modality or display, movement of the imaging modality, an actuation of a light source for illumination of a work area, capture or upload of an image or video, switching an application or an active software program of the display, actuation of a smart glass feature of the system, turn the system off, actuating a voice or a touch control, sending or receiving information or a notification to or from a remote location, initiating a power source alteration or hot swap, movement of a cart comprising the imaging modality on the support, movement of the support, or actuating the imaging modality to a use position or a storage position.

8. The wearable optical system of claim 1, wherein one or more functions of the system are controlled by voice command.

9. The wearable optical system of claim 8, wherein the one or more functions comprises altering an optical or a digital focus of the imaging modality or display, movement of a focus of the imaging modality or display, movement of the imaging modality, an actuation of a light source for illumination of a work area, capture or upload of an image or video, switching an application or an active software program of the display, actuation of a smart glass feature of the system, turn the system off, actuating a voice or a touch control, sending or receiving information or a notification to or from a remote location, initiating a power source alteration or hot swap, movement of a cart comprising the imaging modality on the support, movement of the support, or actuating the imaging modality to a use position or a storage position.

10. The wearable optical system of claim 1, wherein the support is configured for movement relative to the user wearable frame between a use position and a storage position.

11. The wearable optical system of claim 10, wherein the storage position is located outside of the horizontal optical path.

12. The wearable optical system of claim 1, wherein the predetermined range is an angular adjustment of between 0.1 to 45 degrees within the working area angle.

13. The wearable optical system of claim 2, further comprising a light source comprised within the cart.

14. The wearable optical system of claim 1, further comprising a light source comprised on the support.

* * * * *